United States Patent
Dai et al.

(10) Patent No.: US 6,246,692 B1
(45) Date of Patent: Jun. 12, 2001

(54) PACKET SWITCHING FABRIC USING THE SEGMENTED RING WITH RESOURCE RESERVATION CONTROL

(75) Inventors: William Dai, San Jose; Jason Chao, Cupertino; Cheng-chung Shih, Fremont, all of CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/092,350

(22) Filed: Jun. 5, 1998

Related U.S. Application Data

(60) Provisional application No. 60/073,535, filed on Feb. 3, 1998.

(51) Int. Cl.$^7$ .............................. H04L 12/40; H04L 12/66
(52) U.S. Cl. .......................... 370/438; 370/463; 370/439
(58) Field of Search .................................. 370/222, 224, 370/258, 359, 410, 419, 424, 439, 438, 452, 545, 447, 461, 462, 463, 465, 468

(56) References Cited

U.S. PATENT DOCUMENTS

| | | | |
|---|---|---|---|
| 4,554,659 | * 11/1985 | Blood et al. | 370/452 |
| 5,181,202 | * 1/1993 | Walser et al. | 370/452 |
| 5,206,857 | * 4/1993 | Farleigh | 370/452 |
| 5,208,809 | * 5/1993 | Fergeson et al. | 370/452 |
| 5,521,913 | 5/1996 | Gridley | 370/58.2 |
| 5,764,392 | * 6/1998 | Van As et al. | 370/460 |

OTHER PUBLICATIONS

"QR0001 QuickRing™ Data Stream Controller", National Semiconductor Corporation—©1995 National Semiconductor Corporation, Preliminary Oct. 1994, pp. 1–40.

* cited by examiner

*Primary Examiner*—Chau Nguyen
*Assistant Examiner*—Chiho Andrew Lee
(74) *Attorney, Agent, or Firm*—Arent Fox Kintner Plotkin & Kahn PLLC

(57) ABSTRACT

A packet switching fabric includes a data ring, a control ring, a plurality of network links each coupled to at least one network node, and a plurality of switching devices coupled together by the data ring and the control ring so that the network links can be selectively communicatively coupled. Each of the switching devices includes: a data ring sub-system for transmitting and receiving bursts of data via data ring channels concurrently active on the data ring; a network interface coupled to the data ring sub-system and having at least one network port for transmitting and receiving data packets to and from one of the network links, the network interface also having a packet buffer for storing the data packets, the packet buffer providing bursts of packet data to the data ring sub-system via a plurality of concurrently active packet buffer channels; and a control ring sub-system coupled to the data ring sub-system and to the network interface and being responsive to control messages received from an adjacent one of the devices via the control ring, and operative to develop and transmit the control messages to an adjacent one of the devices via the control ring, the control messages for reserving bandwidth resources used in setting up and controlling the data ring channels and the packet buffer channels, the control ring sub-system also being operative to perform queuing operations for controlling the transfer of the bursts of packet data from the packet buffer to the data ring sub-system.

28 Claims, 16 Drawing Sheets

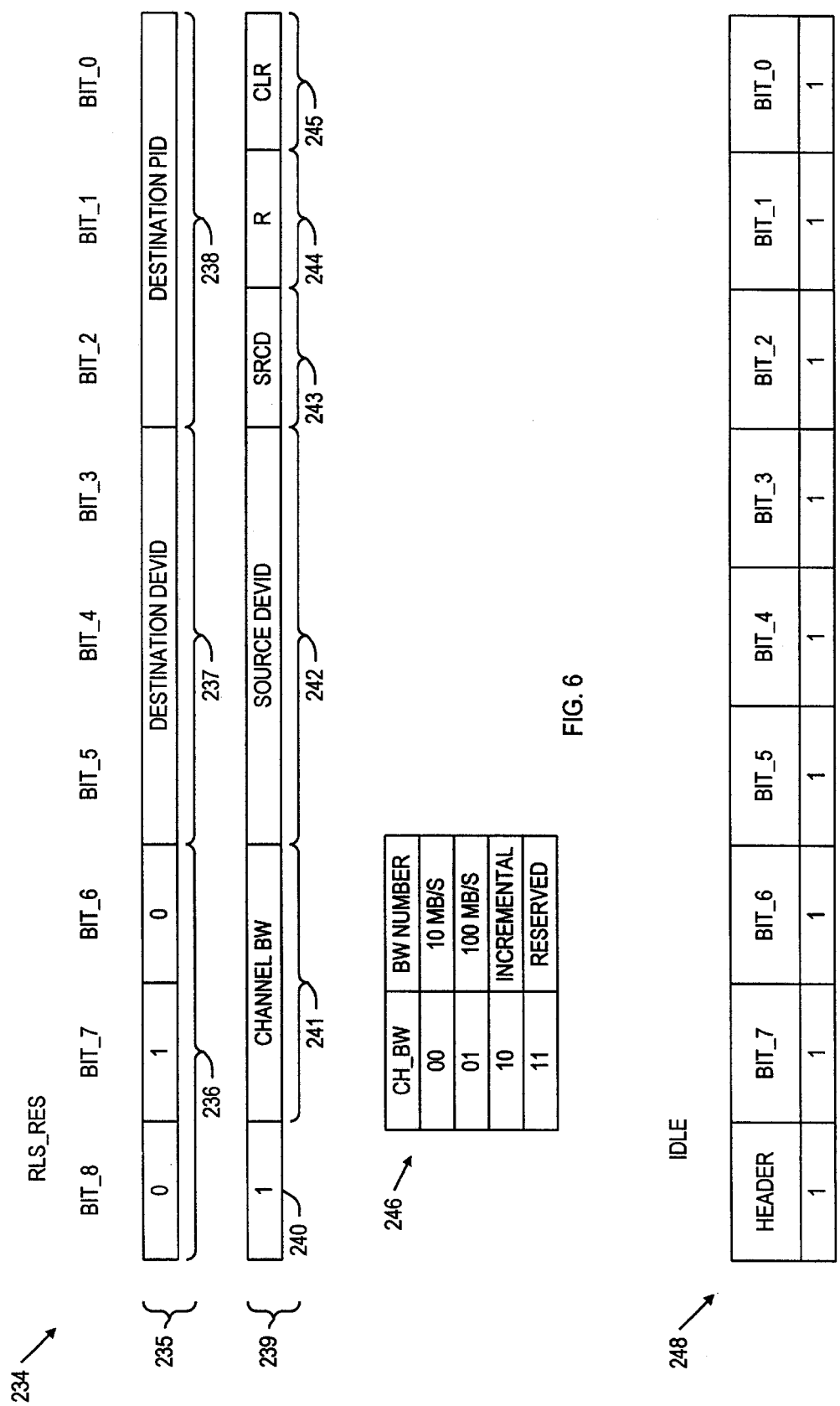

PACKET SWITCHING FABRIC USING THE SEGMENTED RING WITH RESOURCE RESERVATION CONTROL

CROSS-REFERENCE TO RELATED APPLICATIONS

Reference is made to and priority claimed from U.S. Provisional Application Ser. No. 60/073,535, filed Feb. 3, 1998, entitled "Packet Switching Fabric Using the Segmented Ring With Resource Reservation Control."

BACKGROUND OF THE INVENTION

1. Field of the Invention

The present invention relates generally to packet switching fabrics for use in data communications networks. Specifically, the present invention pertains to a packet switching fabric having a plurality of devices arranged in a ring topology and intercoupled coupled via data ring segments to form a data ring, and also via control ring segments to form a control ring used for implementing a resource reservation protocol for managing bandwidth resources of the data ring.

2. Description of the Prior Art

Switching devices are essential components of data communication networks including local area networks (LANs), such as ETHERNET, and wide area networks (WANs). Common switching devices include cross bar switching devices, and packet switching fabrics. A packet switching fabric is an interconnection architecture which uses multiple stages of switches to route transactions between a source address and a destination address of a data communications network. A packet switching fabric may have a variety of different architectures, or topologies.

Cross bar switching devices typically include a number, N, of input ports, N output ports, and a switching matrix having redundant interconnection resources requiring a complexity of NxN for selectively connecting the input ports to the output ports. One problem with cross bar switching devices is scalability of the number of network ports. Because of the NxN complexity of the interconnection resources, exponential costs are incurred when increasing the number of network ports of a cross bar switching device.

Because packet switching fabrics include multiple switching devices, fabrics provide better scalability because each of the switching devices of the fabric includes a plurality of network ports and the number of switching devices of the fabric may be increased to increase the number of network connections for the switch. However, prior art packet switching fabrics usually have a bus topology including a back plane, or bus, having a plurality of slots for cards including the network ports. One problem with such switching devices is modularity. While a number of cards having additional network ports may be inserted into slots of the back plane to increase the total number of network ports, the maximum number of cards which may be added is limited because the back plane may support only a limited number of cards due to loading effects on the back plane. Therefore, the modularity problem of bus architecture packet switching fabrics imposes a limit on the scalability of the number of network ports of the fabric.

Typically, each device of a switching fabric includes a plurality of switch devices each including: network ports for transmitting and receiving data packets to and from network nodes via network communication links; and internal data link ports for transmitting and receiving data packets to and from other switch devices of the fabric.

The switching devices of a switching fabric may be configured in any one of a variety of topologies, or architectures. In a switching fabric having a ring architecture, the devices are configured in a ring topology. Because each connection in a ring architecture switching fabric is a point to point link, ring architecture switching fabrics allow for higher frequencies and greater throughput between devices than bus architecture fabrics.

Typical prior art ring architecture switching fabrics are controlled by a token ring protocol wherein only one device of the ring transmits data at a time. Therefore, prior art ring architecture switching fabrics are not commonly used for network switching which requires high data throughput. An important objective of the present invention is to provide ring architecture packet switching fabric which is capable of concurrently processing an increased number of interconnect transactions between multiple source devices and corresponding destination devices thereby allowing for greater switching throughput.

Each switch device of a switching fabric reads header information of a data packet received from a source node via one of its network ports to dynamically route the data packet to an appropriate destination network port, or ports, which is communicatively to a destination node specified by a destination address carried in the header information of the data packet. The destination network port may be a local network port of the same device having the source port at which the packet is received, or a network port of another device of the switching fabric. The process of transferring a data packet received at a network port of a source device to a network port of a destination device is referred to as an interconnect transaction. In order to transfer data from a source device to a destination device, an internal source-destination path coupling the source port to the destination port is required.

In many data communications networks, and particularly in local area networks, (e.g., ETHERNET), when a destination node of the network begins receiving a data packet, the transmission of the data packet to that node cannot be interrupted, even by transmission of an idle signal. Therefore, transmission of a data packet from the destination output port of the switching fabric to the destination node must not be interrupted. Therefore, most switching fabrics include transmit buffers at each network port which are large enough to store a whole packet of data. However, this is undesirable because large buffers require limiting the number of network ports which can be implemented on an integrated circuit.

Another objective of the present invention is to provide a ring architecture packet switching fabric wherein each integrated circuit device of the fabric has higher integration thereby allowing for an increased number of network ports.

A further objective of the present invention is to provide a packet switching fabric providing convenient scalability wherein the total number of network ports supported by the fabric may be scaled up without incurring exponential costs such as in cross bar switching devices.

Yet another objective of the present invention is to provide a packet switching fabric which provides higher data transfer rates through source-destination paths between switching devices of the fabric thereby allowing for cut-through packet transfer between a source device and the destination port. Achieving this objective of the present invention also provides a packet switching fabric wherein each switching device of the fabric has an increased number of ports.

SUMMARY OF THE INVENTION

A packet switching fabric according to the present invention includes a data ring, a control ring, a plurality of data communication network links each having at least one network node coupled thereto, and a plurality of switching devices coupled together by the data ring and the control ring, so that the network links can be selectively communicatively coupled. The packet switching fabric includes a data ring processing sub-system, a network interface sub-system, and a control ring sub-system.

The data ring processing sub-system includes a data input interface for receiving bursts of data from an adjacent one of the devices via at least one of a plurality of data ring channels concurrently active on the data ring, and a data output interface for transmitting bursts of data to an adjacent one of the devices via at least one of the plurality of data ring channels.

The network interface sub-system, coupled to the data ring processing sub-system, includes at least one network port coupled to one of the network links, each network port having a port ID value associated therewith. The network interface sub-system also includes a packet buffer for storing received data packets in memory locations specified by corresponding address pointers, each of the received data packets being received via an associated source port of the network ports. Each of the data packets includes header information specifying a destination address of a destination node. The packet buffer has a packet buffer output interface for providing bursts of packet data to the data output interface via a plurality of concurrently active packet buffer channels.

The control ring processing sub-system, coupled to the data ring processing sub-system and to the network interface sub-system, are responsive to control messages received from an adjacent one of the devices via the control ring, and are also operative to develop and transmit control messages to an adjacent one of the devices via the control ring. The control messages provide reservation of bandwidth resources that are used in setting up and controlling the data ring channels and the packet buffer channels.

The control ring processing sub-system includes a control ring receiving unit, control ring message pass-by processing unit, a control ring transmitting unit, an input queuing control unit, a channel bandwidth resource manager, and a message termination processing unit. The input queuing control unit is responsive to the destination addresses corresponding to each data packet, and operative to identify the port ID value of a destination port of the network ports communicatively coupled to the destination node. The message termination processing unit is responsive to the destination port ID value, and operative to generate a source request message for requesting setup of a particular one of the data channels for transmitting a particular one of the received data packets from the associated source port to the associated destination port. The message termination processing unit is also operative to generate data channel request signals associated with local ones of the data ring channels sourced from or traversing the switching device in response to the control messages. The message termination processing unit is further operative to generate: packet buffer channel request signals associated with the packet buffer channels; and queuing enable signals.

The bandwidth resource managing unit is responsive to the data channel request signals and the packet buffer channel request signals, and operative to set up and allocate a variable amount of bandwidth for the packet buffer channels and the data channels. The input queuing control unit is further responsive to the address pointers associated with each the data packet stored in the packet buffer, and in response to the queuing enable signals, is operative to access the data packets a data burst at a time from the external packet buffer, the input queuing control unit also being operative to couple the packet buffer output interface to the data ring output interface to transmit the data bursts via the packet buffer channels.

An important advantage of the present invention is that the dynamic allocation of data path bandwidth through each device of the fabric, as controlled by the resource reservation protocol, allows for multiple interconnect transactions, between multiple source devices and corresponding destination devices, to be processed concurrently thereby providing statistically higher throughput.

Another advantage of the present invention is that the dynamic allocation of data path bandwidth through each device of the fabric, as controlled by the resource reservation protocol, allows for higher data transfer rates through the source-destination paths between devices which allows for cut-through packet transfer between the source device and the destination port. The ability to implement cut-through packet transfer allows for using small transmit buffer queues at network ports of the devices which allows for larger scale integration on the device integrated circuit thereby allowing for an increased number of network ports on each device.

IN THE DRAWINGS

FIG. 6 is a block diagram depicting the field structure of a release resource (REL_RES message) used in the resource reservation protocol of the present invention;

FIG. 7 is a block diagram depicting the field structure of an IDLE message used in the resource reservation protocol of the present invention;

DETAILED DESCRIPTION OF THE PREFERRED EMBODIMENTS

Figure 1:
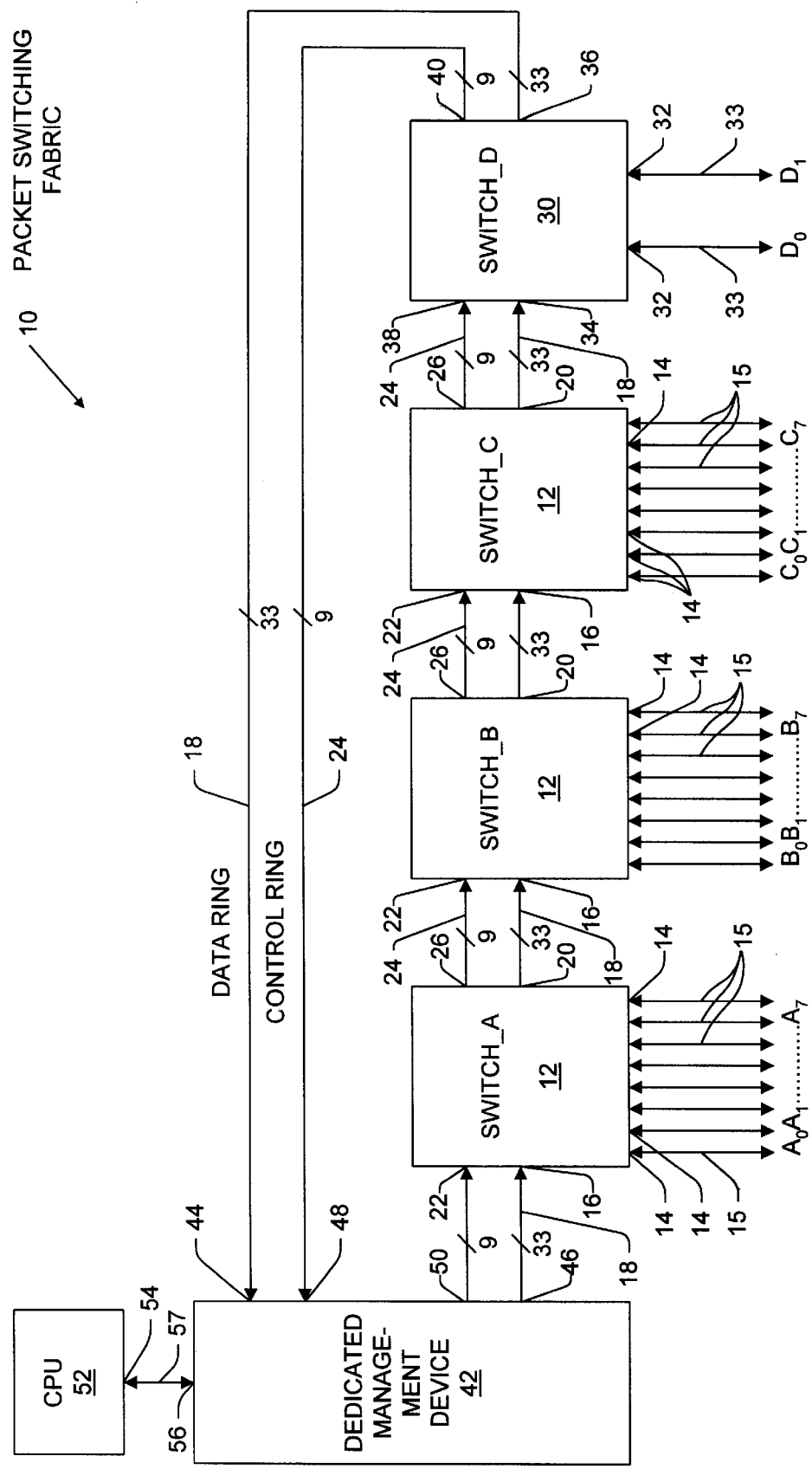
FIG. 1 is a schematic block diagram of a packet switching fabric according to the present invention including a plurality of switching devices arranged in a ring topology and intercoupled coupled via data ring segments and control ring segments used for implementing a resource reservation protocol for managing the data transfer capacity of each data ring segment.

FIG. 1 shows at 10 a schematic block diagram of a packet switching fabric according to the present invention including three cut-through packet transfer switching devices 12, designated SWITCH_A, SWITCH_B, and SWITCH_C, each having: eight network ports 14 designated ($A_0$, $A_1$, ..., $A_7$), ($B_0$, $B_1$, ..., $B_7$), and ($C_0$, $C_1$, ..., $C_7$) respectively for transmitting and receiving data packets via corresponding lower and middle bandwidth ETHERNET links 15 each having a bandwidth of either 10 Mbps or 100 Mbps; a data ring input port 16 connected to receive data and data ring messages from an upstream device via a corresponding one of a plurality of 33-bit data ring segments 18; a data ring output port 20 connected to transmit data and data ring messages to a corresponding downstream device via a corresponding one of the data ring segments 18; a control ring input port 22 connected to receive control ring messages which include resource reservation protocol messages from the corresponding upstream device via a corresponding one of a plurality of 9-bit control ring segments 24; and a control ring output port 26 connected to transmit control ring messages to the corresponding downstream device via a corresponding one of the control ring segments 24.

The packet switching fabric 10 also includes a high speed network port switching device 30, designated SWITCH_D, having: two high speed network ports 32 designated $D_0$ and $D_1$ for transmitting and receiving data packets via a pair of corresponding 1 Gbps ETHERNET links 33; a data ring input port 34 connected to receive data and data ring messages from the upstream device, SWITCH_C, via a corresponding one of the data ring segments 18; a data ring output port 36 connected to transmit data and data ring messages to a corresponding downstream device via a corresponding one of the data ring segments; a control ring input port 38 connected to receive control ring messages from the corresponding upstream device via a corresponding one of the control ring segments 24; and a control ring output port 40 connected to transmit control ring messages to the corresponding downstream device via a corresponding one of the control ring segments.

The packet switching fabric 10 further includes: a dedicated ring management device 42 having a data ring input port 44 connected to receive data and data ring messages from the corresponding upstream device, SWITCH_D, via a corresponding one of the data ring segments 18, a data ring output port 46 connected to transmit data and data ring messages to the corresponding downstream device, SWITCH_A, via a corresponding one of the data ring segments, a control ring input port 48 connected to receive control ring messages from the upstream device, SWITCH_D, via a corresponding one of the control ring segments 24, and a control ring output port 46 connected to transmit control ring messages to the downstream device via a corresponding one of the control ring segments; and a central processing unit 52 having a port 54 connected to a port 56 of the management device 42 via a CPU link 57. The bandwidth, or data transfer capacity, of the CPU link 57 depends on the bandwidth of the bus of the CPU. Each of the data ring segments 18 is 33 bits wide and is used for transmitting data channel link signals which are clocked at 66 MHz. The total bandwidth for signals transmitted via each data ring segment is 2.112 Gbps. Each of the control ring segments 24 of the fabric is 9 bits wide and is used for transmitting control ring signals which are also clocked at 66 MHz.

Each device of the switching fabric 10 includes means, further explained below, for processing and propagating data and data ring messages to the adjacent downstream device via the corresponding data ring segment so that the devices and the data ring segments form a data ring path. Each device of the switching fabric 10 also includes means, further explained below, for processing and propagating control ring messages including resource reservation protocol messages between the devices via the control ring segments to reserve data ring bandwidth resources before data is transferred via the data ring path. The resource reservation protocol is used to set up and control the bandwidth of a plurality of concurrently activated source-destination channels prior to beginning data transfer from a source device to a destination device via an associated source-destination channel. The amount of bandwidth allocated for each source-destination channel is commensurate with the network link capacity of a destination network port. As further described below, the appropriate amount of bandwidth is allocated for each source-destination channel before the corresponding packet transfer begins so that the packet transfer will not be disturbed during its network transmission.

Figure 2A:
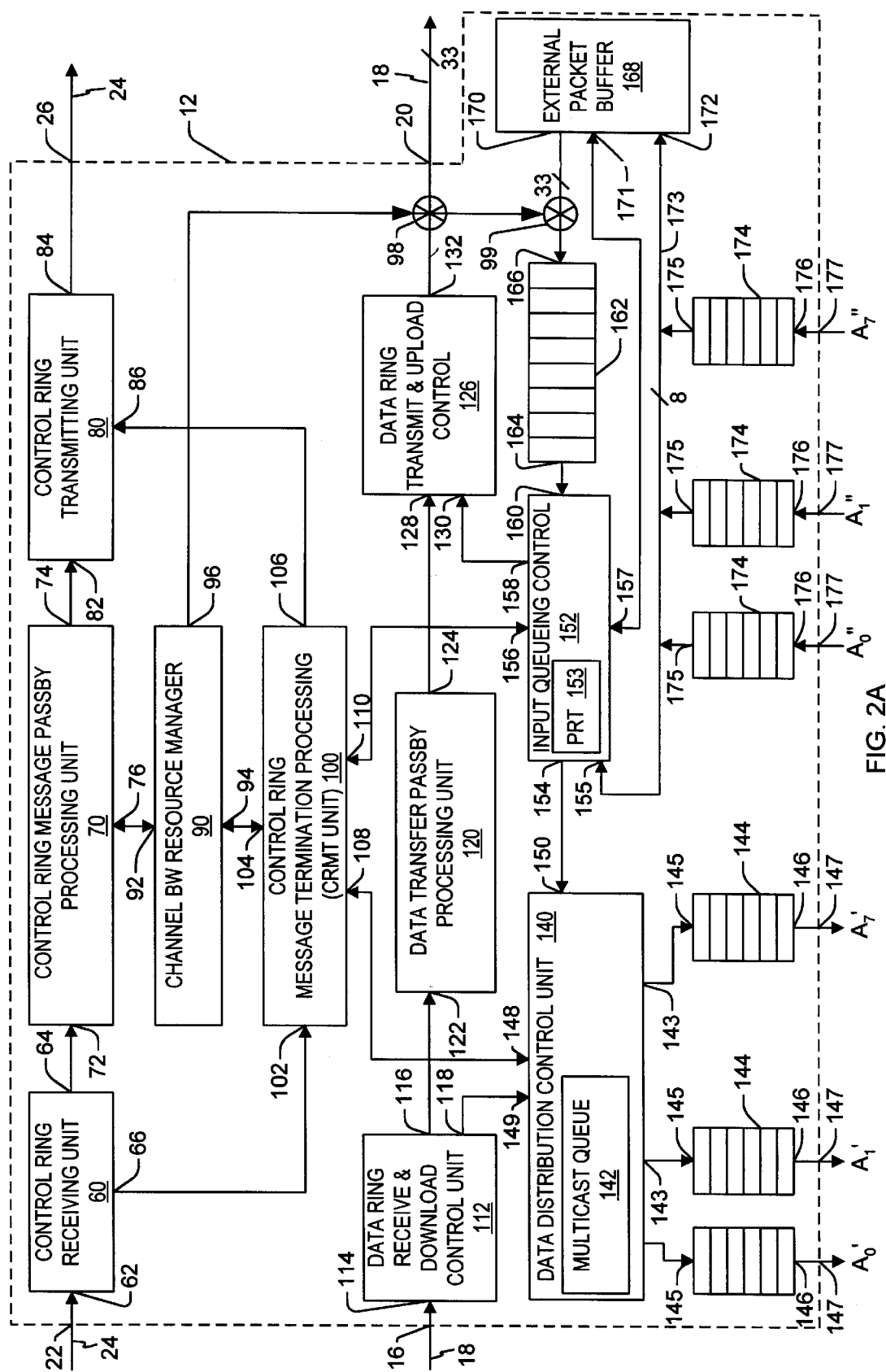
FIG. 2A is a detailed schematic circuit block diagram of components of a cut-through packet transfer switching device of the packet switching fabric of FIG. 1.

FIG. 2A shows a detailed schematic circuit block diagram of components of one of the cut-through packet transfer switching devices 12 of the packet switching fabric of 10 (FIG. 1). In a preferred embodiment of the present invention, each of the switching devices 12 is implemented by an application specific integrated circuit (ASIC).

The depicted switching device 12 has a control ring processing sub-system including: a control ring receiving unit 60 having an input port 62 connected to receive control ring messages including resource reservation protocol messages via control ring input port 22, a pass-by port 64, and a termination port 66; a control ring message pass-by processing unit 70 having an input port 72 connected to receive control ring messages from port 64 of receiving unit 60, an output port 74, and a control port 76; a control ring transmitting unit 80 having an input port 82 connected to receive control ring messages from output port 74 of the pass-by processing unit 70, an output port 84 connected to provide the control ring messages to control ring output port 26 of the switching device, and a control port 86; a channel bandwidth resource manager 90 having a control port 92 connected to the control port 76 of the pass-by processing unit 70, a control port 94, and a bandwidth control port 96 connected to provide channel bandwidth resource control signals to a data ring channel bandwidth resource means 98 and a packet buffer channel bandwidth resource means 99 further explained below; and a control ring CRMT processing unit (CRMT processing unit) 100 having an input 102 connected to receive control ring messages from port 66 of the control ring receiving unit 60, a control port 104 connected to provide packet buffer channel request signals and data ring channel request signals to port 94 of the channel bandwidth resource manager 90, an output 106 connected to provide control ring messages to the input 86 of the control ring transmitting unit 80, a port 108, and a port 110.

The depicted switching device 12 also has a data ring processing sub-system including: a data ring input interface in the form of a data ring receive and download control unit 112 having an input 114 connected to receive data messages and packet data bursts from a corresponding upstream device via a corresponding data segment 18 and the data ring input port 16 of the switching device, a data output 116, and a data port 118; a data transfer pass-by processing unit 120 having a data input 122 connected to receive data from output 116 of the data ring receive and download control unit 112, and an output 124; a data ring output interface in the form of a data ring transmit and upload control unit 126 having a data input 128 connected to output 124 of the data transfer pass-by processing unit 120, an input 130, and an output 132 connected to the data ring output port 20 via the data ring channel bandwidth resource means 98 which is responsive to the channel bandwidth resource control signals provided by the channel bandwidth resource manager 90 to control the data ring channel bandwidth resources of the 33 bit wide communication path between output 132 of unit 126 and the data ring output port 20, as further explained below; a data distribution control unit 140 having a multicast queue 142, eight outputs 143, an output 148, an input 149 connected to receive packet data bursts and data ring messages from output 118 of the data ring receive and download control unit 112, and an input 150; and eight transmit buffer queues 144 each having an input 145 connected to receive data from a corresponding one of the eight outputs 143 of the data distribution control unit 140, and an output 146 connected to a corresponding one of eight network output ports 147 designated ($A_0'$, $A_1'$, . . . , $A_7'$).

The control ring processing sub-system of the depicted switching device 12 further includes an input queuing control unit 152 having a packet routing table (PRT) 153 having packet routing information as further described below, an output 154 connected to provide data to the input 150 of the data distribution control unit 140, a bus port 155, a control port 156 connected to port 110 of the CRMT processing unit 100, an output 158 connected to input 132 of the data ring transmit and upload control unit 126, a packet buffer memory control port 157, and a data input 160.

A network interface sub-system of the depicted switching device 12 includes an internal first in-first out buffer (internal FIFO) 162 having an output 164 connected to provide data to input 160 of the input queuing control unit 152, and an input 166; an external packet buffer 168 having a data output 170 connected to input 166 of the internal FIFO 162 via the packet buffer channel bandwidth resource means 99 which is responsive to the channel bandwidth resource control signals provided by the channel bandwidth resource manager 90 to control the bandwidth resources of the 32 bit wide communication path between output 170 of packet buffer 168 and input 166 of the internal FIFO 162, a control port 171 connected to receive queuing control signals from the packet buffer memory control port 157 of the input queuing control unit 152 and also providing data address pointer information to control port 157 of the input queuing control unit, and an input 172 connected to a bus 173 which is connected to bus port 155 of the input queuing control unit 152; and eight receive buffer queues 174 each having an output 175 connected to provide data to input 172 of the external packet buffer 168 via the bus 173, and an input 176 connected to receive data from a corresponding one of eight network input ports 177 designated ($A_0''$, $A_1''$, . . . , $A_7''$). The eight network input ports 177 designated ($A_0''$, $A_1''$, . . . , $A_7''$), and corresponding eight network output ports 147 designated ($A_0'$, $A_1'$, . . . , $A_7'$) are implemented by the eight network bi-directional ports 14 designated ($A_0$, $A_1$, . . . , $A_7$) (FIG. 1).

In the preferred embodiment, each of the eight transmit buffer queues 144, and each of the eight receive buffer queues 174, is implemented by a first in-first out buffer (FIFO) which is limited in size in order to increase the integration level of the ASIC implementing the switching device 12. Also in the preferred embodiment, the external packet buffer 168 is not implemented on the ASIC which implements the other components of the depicted switching device. Further, in the preferred embodiment, the external packet buffer 168 is implemented by a dynamic RAM (DRAM) memory device.

In the preferred embodiment, because each of the eight transmit buffer queues 144 is limited in size, the transmit buffer queues 144 are too small to store a whole data packet. Because local area networks, such as ETHERNET, require uninterrupted transmission of a data packet to its destination node, the switching fabric 10 (FIG. 1) implements cut-through packet transfer through the lower and middle speed destination port transmit buffer queues 144 each of which is connected to either a 10 Mbps data communication link, or a 100 Mbps data communication link. In accordance with the cut-through packet transfer, while a data stream is being received at the data ring input 16 of the device 12 from an upstream source device via a source-destination channel set up via the control ring, preceding data of the same data stream is simultaneously transmitted from the appropriate one of network output ports 147 so that the corresponding transmit queue 144 does not overflow or underflow.

In addition to transferring packet data bursts, the data ring is used for transferring data messages transferred from one device to the next via the data ring include: management information base event messages (MIB event messages) having received MIB events, a transit MIB events, or report events, system configuration messages, and status report messages generated by local event generators of the switching devices. Data structures for a data packet block header, a table convergence event, an IDLE data ring message, a Receive MIB event message, a Transmit MIB event message, a Command event, and a Report event for the described embodiment of the present invention are shown in the attached appendix.

When a data ring message is received by a device from upstream via the data ring, the data ring receive and download control unit 112 checks the header of the message and processes the data message accordingly. If the message is a Received MIB event, a transit MIB event, or a report event, the message will be propagated downstream without modification via the data ring message pass-by processing unit. If the message received is a command event for another device, the message will be propagated downstream without modification. If the message received is a command event for the receiving device, the download control unit 112 of the receiving device executes the command and terminates the message. If the data ring message received by a device from upstream via the data ring is a table convergence event message, the download control unit 112 of the receiving device will copy the event for table convergence execution, and the message will be propagated downstream by the data transfer pass-by processing unit 120 via the data ring without modification and terminated at the device that issued the message.

An ETHERNET frame, or packet of data, includes header information specifying a source address of a source end node, and a destination address of a destination end node. ETHERNET frames typically have a length between 64 bytes and 1536 bytes. When a data packet is received via one of the network input ports 177, the data packet is initially buffered by the corresponding receive buffer queue 174 and passed to the bus 173. The input queuing control unit 152, which is connected to the bus via its input 155, receives the header information of the packet including the ETHERNET destination address of the packet. Concurrently, the packet is transmitted to and stored in the external packet buffer 168. Upon storing the data packet, the packet buffer 168 provides pointer addresses to the memory control port 157 of the input queuing control unit 152 which includes queuing structure storage registers for storing pointer addresses corresponding to each received data packet.

The input queuing control unit 152 reads the destination address included in the header information of each data packet received via the network ports to determine a destination port of the packet via the packet routing table 153 which provides ID codes of the destination device and output port which is communicatively coupled to the destination end node specified by the destination address. The packet routing table 153 indicates to which network output port 147 of which device a particular packet must be forwarded to reach the end node indicated by the destination address specified by the packets header. The input queuing control unit 152 reads the header information of the data packet including the source address and destination address, and performs a packet destination look up operation using the destination address. In an embodiment of the present invention, the input queuing control unit 152 performs an automatic address learning function to create and continually update the packet routing table 153 using the source address of each data packet received by the unit 152. In alternative embodiments, the packet routing table 153 is created via manual entry, or via a combination of the manual entry and automatic address learning schemes.

The destination address specified by the header information of a data packet may be a multicast address which specifies multiple destination nodes, or a broadcast address which is specifies all destination nodes in the network. For multicast addresses, the packet routing table 153 may yield multiple destination port ID values for one or more destination devices. If the destination address of a data packet includes more than one of the network ports of a device receiving the message, the message will be terminated from the data ring and copied to the multicast buffer 142. From the multicast buffer 142, the data message is distributed to the transmit buffer queues 144 of the corresponding destination network ports for transmission.

If no match is found for a specified destination address in the packet routing table 153, the destination address is unknown. In this case, the packet may be broadcast to all ports (except the receiving port of the receiving device), or may be transferred only to an up-link port specified at the receiving port. When a match is found in the packet routing table 153 for a destination address specified by packet header information, it is then determined whether the destination address is connected to a network port of the receiving device, or to a network port of another device of the switching fabric 10. If the destination port is a network port 14 (FIG. 1) of the receiving device, only a local transaction must be processed.

If the destination port is a network port 14 (FIG. 1) of a device of the fabric other than the receiving device, the corresponding interconnect transaction is not local and the data packet must be transferred from the receiving device, or "source device", to the destination device having the destination port via the data ring by processing an interconnect transaction which requires resource reservation performed using the resource reservation protocol of the present invention.

For local transactions for which the destination port is a local interconnect output port: if the source selected by the arbitration process is the local multicast queue 142 of the data distribution control unit 140, the packet at the head of the multicast queue 142 is transferred to the appropriate one of the transmit buffer queues 144 for transmission via the corresponding network output port 147; and if the source selected by the arbitration process is one of the local receive buffer queues 174, the channel bandwidth resource manager 90 sets up a channel to communicatively couple the external packet buffer 168 to the appropriate one of the transmit buffer queues 144 when the requested packet buffer channel bandwidth is available. In a local interconnect transactions for which the destination port is the local multicast queue, if the source selected is a local receive queue 174, the channel bandwidth resource manager 90 sets up a channel to communicatively couple the external packet buffer 168 to the multicast queue when the requested packet buffer channel bandwidth is available.

The resource reservation protocol of the present invention is used to set up source-destination channels for each interconnect transaction prior to beginning the transfer of data from a source device to a destination device via a source-destination channel on the data ring. The resource reservation protocol manages the bandwidth allocation for the source-destination channel of each interconnect transaction, based on the network link capacity of the destination port, before the corresponding packet transfer begins so that the packet transfer will not be disturbed during its network transmission. The resource reservation protocol is implemented using resource reservation protocol control messages including a source request message (SRC_REQ message), a get resource message (GET_RES message), a destination grant message (DST_GRANT message), a release resource message (RLS_RES message), and IDLE messages.

Upon receiving a protocol control message at a device via the control ring input 22, the control ring receiving unit 60 makes preliminary determinations including: reading the message to determine the type of message received; and comparing source and destination device ID fields of the message to the local device ID. When appropriate, as further explained below, the control ring receiving unit 60 transfers the message directly to the control ring message pass-by processing unit 70 which transfers the message downstream on the control ring via the control ring transmitting unit 80. Generally, if the destination of a resource reservation protocol control message received by a device is local, the control message is terminated on the control ring, downloaded for further local processing, and processed locally without being delivered downstream. Also generally, if the destination of a control ring message received by a device is not local, the message is delivered downstream. Each of the devices 12, 30, and 42 of the switching fabric 10 (FIG. 1) includes means for synchronizing and retiming messages received via its upstream device.

To initiate an interconnect transaction, the CRMT processing unit 100 of a source device develops a SRC_REQ message, further explained below, including a field carrying the destination port ID code associated with the destination port, determined by and received from the input queuing control unit 152. The CRMT processing unit 100 transmits the SRC_REQ message via the control ring transmit unit 80 to the destination device via the control ring.

When a destination device receives a SRC_REQ message at its control ring receiving unit 80 from a source via the control ring, the SRC_REQ message is transferred to the CRMT processing unit 100 where it is temporarily buffered. The CRMT processing unit 100 selects from multiple interconnect transactions corresponding to multiple SRC_REQ messages according to a destination resource arbitration process. After the CRMT processing unit 100 selects an interconnect transaction corresponding to a particular SRC_REQ message, the termination processing unit 100 transfers a GET_RES message to the control ring via transmitting unit 80 to reserve the necessary bandwidth resources for the corresponding interconnect transaction via a source-destination channel. The source-destination channel is set up to accommodate the bandwidth of the destination output port.

As mentioned, the channel bandwidth resource manager 90 provides control of: the data ring channel bandwidth resources of the 33 bit wide communication path between output 132 of unit 126 and the data ring output port 20; and the packet buffer channel bandwidth in the path between the output 170 of the external packet buffer 168 and the input 166 of the internal FIFO 162. The data packets are read out a burst at a time from the external packet buffer 168 via multiple channels under control of queuing structure logic of the input queuing control unit 152.

The packet buffer channel bandwidth resource means 99, which may be implemented by a DRAM interface, has a limited maximum packet buffer bandwidth. A fixed amount of bandwidth is allocated for data packets flowing between the receive queues 174 and input 172 of the external packet buffer. As mentioned, the packet buffer channel path between the data output 170 of the external packet buffer 168 and input 166 of the internal FIFO 162 is controlled by the packet buffer channel bandwidth resource means 99 in response to the channel bandwidth resource control signals provided by the channel bandwidth resource manager 90.

When the channel bandwidth resource manager 90 allocates sufficient external packet buffer channel bandwidth, the packet buffer begins transmitting packet data bursts from output 178 of the buffer 168 to input 166 of the internal FIFO 162 under control of the input queuing control unit 152.

In the described embodiment, the total bandwidth available in transmitting data and data ring messages to the data ring segment 18 from output 132 of the data ring transmit and upload control unit 126 is 2.112 Gbps. Therefore, this path may support up to twenty 100 Mbps channels. Data messages are transmitted from output 132 of unit 126 in bursts of 64 bytes (or 512 bits) per second. For a data channel operating at 100 Mbps, one bit is transmitted in 10 nanoseconds, and one burst is transmitted in 5120 nanoseconds. For this embodiment, the period of the channel rate timer may be 5120 nanoseconds. It will be readily understood to those skilled in the art that the bandwidth resource manager 90 may be implemented in accordance with a wide variety of methods. In the described embodiment, the bandwidth resource manager 90 has a bandwidth counter which is: increased by 1 upon releasing a 10 Mbps channel; decreased by 1 upon allocating 10 Mbps for a channel; increased by 10 upon releasing a 100 Mbps channel; and decreased by 10 upon allocating 100 Mbps for a channel.

After the last burst of packet data in a channel is read out of the external packet buffer 168, the channel bandwidth resource manager 90 of the source device releases the packet buffer channel bandwidth allocated for that channel. After the last burst of packet data in a channel is transmitted downstream on the data ring via the data ring transmit and upload control unit 126, the channel bandwidth manager 90 of the source device will release the outgoing ring segment bandwidth allocated for the channel.

An advantage of the dynamic bandwidth allocation provided by the resource reservation control is a reduction of head of line blocking effects (HOL blocking effects) on the receive queues 174 (FIG. 2A) coupled to the network input ports 177 and 194.

Figure 2B:
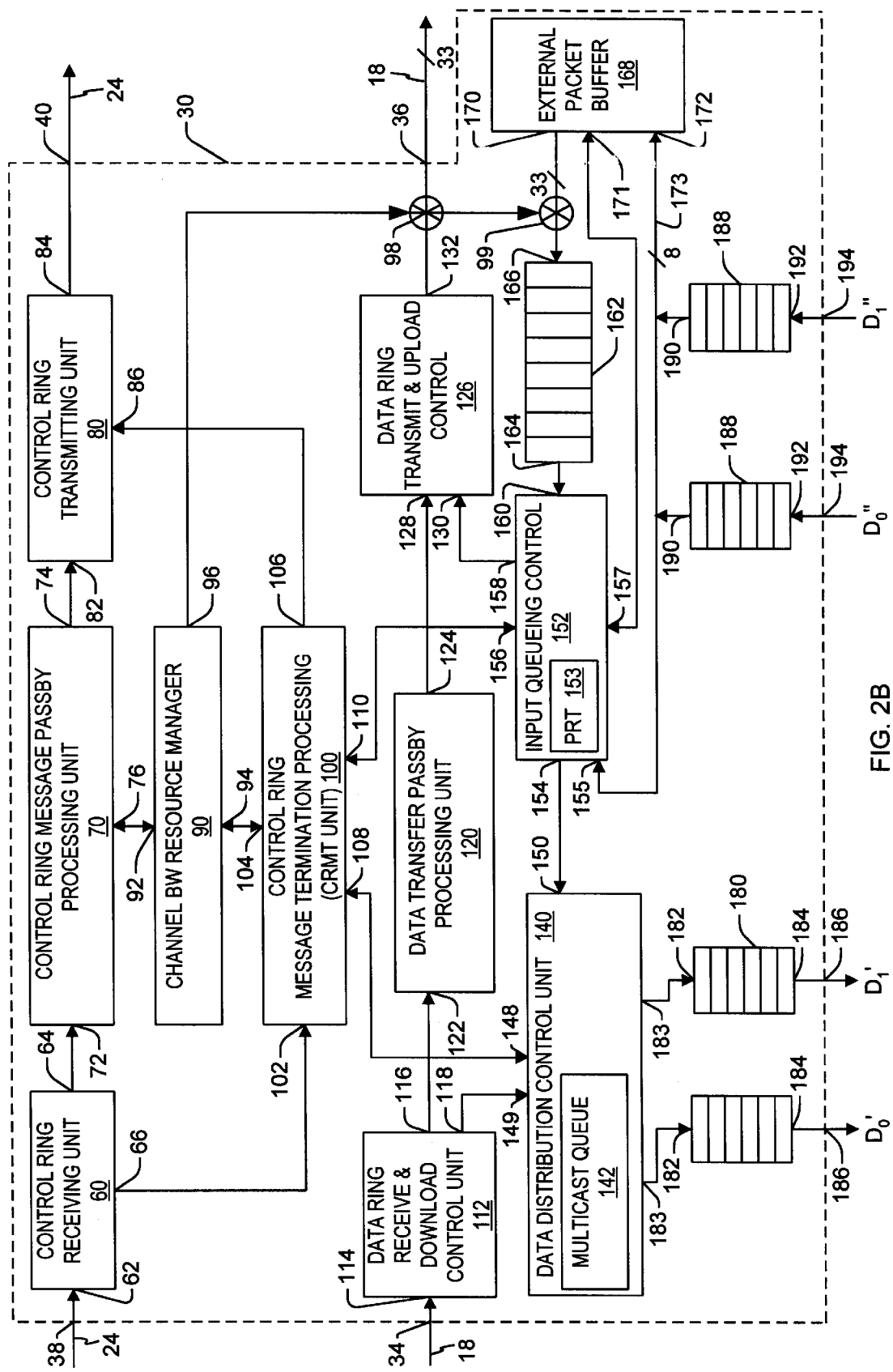
FIG. 2B is a detailed schematic circuit block diagram of components of a high speed network port switching device of the packet switching fabric of FIG. 1.

FIG. 2B shows a detailed schematic circuit block diagram of components of the high speed network port switching device 30 of the packet switching fabric 10 (FIG. 1). The high speed network port switching device 30 is similar to the cut-through packet transfer switching devices 12 except that in order to accommodate the 1 Gbps network ports 32 (FIG. 1) for transmitting and receiving data packets via corresponding 1 Gbps ETHERNET links 33, larger transmit buffer queues capable of storing a whole data packet are used, and cut-through packet transfer is not performed.

The depicted high speed network port switching device 30 includes: two transmit buffer queues 180 each having an input 182 connected to receive data from a corresponding one of two outputs 183 of the data distribution control unit 140, and an output 184 connected to a corresponding one of two network output ports 186 designated ($D_0'$ and $D_1'$); and two receive buffer queues 188 each having an output 190 connected to provide data to the input 172 of the external packet buffer 168 via bus 173, and an input 192 connected to a corresponding one of two high speed network input ports 194 designated ($D_0''$ and $D_1''$). The two network output ports 186 designated ($D_0'$ and $D_1'$), and corresponding network input ports 194 designated ($D_0''$ and $D_1''$) are implemented by the two high speed network ports 32 designated ($D_0$ and $D_1$) (FIG. 1). In the preferred embodiment, each of the transmit buffer queues 180 and receive buffer queues 188 is implemented by a FIFO. Each of the receive buffer queues 188 is implemented by a FIFO which is not large enough to hold a whole data packet. Each of the transmit buffer queues 180 is implemented by a FIFO which is large enough to hold a whole data packet, and therefore cut-through packet transfer is not required for high speed destination port interconnect transactions wherein the destination port is a 1 Gbps output port 186 of the high speed network port switching device 30.

For the high speed network port switching device 30, the maximum source-destination data ring channel bandwidth is not reserved all at once because the burden on the total bandwidth resources of the data ring would cause a degradation in the overall performance of the switching fabric. Therefore, for high speed destination port interconnect transactions, wherein the destination port is one of the 1 Gbps network ports 32 (FIG. 2B), an initial source-destination channel is set up and its bandwidth is thereafter increased in incremental steps in accordance with the resource reservation protocol as further explained below. As further explained below, a first GET_RES message is sent for initial channel setup, and then the further GET_RES messages are sent to increase the bandwidth of the source-destination channel in incremental steps in accordance with the resource reservation protocol as further explained below.

In the described embodiment, the bandwidth resolution of the source-destination channels for high speed destination port interconnect transactions is 100 Mbps and in order to establish a channel having the maximum channel bandwidth, the switching fabric sets up an initial channel having a 100 Mbps bandwidth, and then increments the bandwidth from 100 Mbps to the maximum channel bandwidth in incremental steps. In a ring architecture packet switching fabric according to the present invention, the maximum channel bandwidth is currently limited by the maximum bandwidth of the interface of the DRAM memory device used to implement the external packet buffer 168. The maximum channel bandwidth for a source-destination channel set up for a high speed destination port interconnect transaction, wherein the destination port is one of the 1 Gbps network ports 32 (FIG. 2B), may exceed 1 Gbps because the transmit buffer queue is large enough to store a whole packet.

Figure 3:
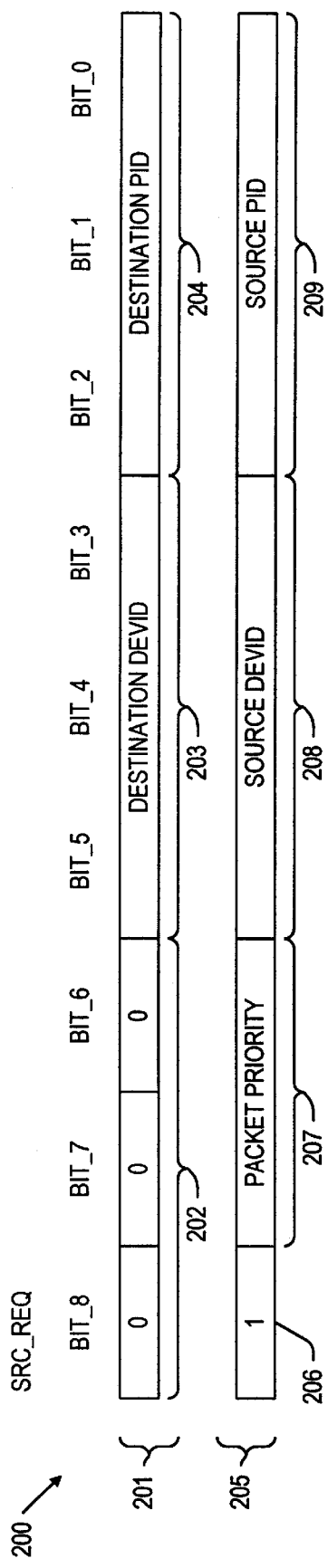
FIG. 3 is a block diagram depicting the field structure of a source request message (SRC_REQ message) used in the resource reservation protocol of the present invention.

FIG. 3 shows a block diagram at 200 depicting the field structure of a SRC_REQ message used in the resource reservation protocol of the present invention. The SRC_REQ message includes 18 bits and is transmitted via one of the 9 bit control ring segments 24 (FIG. 1) during two cycles of the control ring. The SRC_REQ message includes: a first nine-bit string 201 having a 3-bit message field 202 which carries a value "000" to identify the message as a SRC_REQ message, a 3-bit destination device ID field 203 indicating the destination device of a corresponding interconnect transaction, and a 3-bit destination port ID field 204 indicating the destination port of the destination device of the corresponding interconnect transaction; and a second nine-bit string 205 having a single-bit 206 carrying a value of "1", a 2-bit packet priority field 207 which is used to indicate that packet priority is requested as further explained below, a 3-bit source device ID field 208 indicating the source device of the corresponding interconnect transaction, and a 3-bit source port ID field 209 indicating the source port of the source device of the corresponding interconnect transaction.

Figure 4:
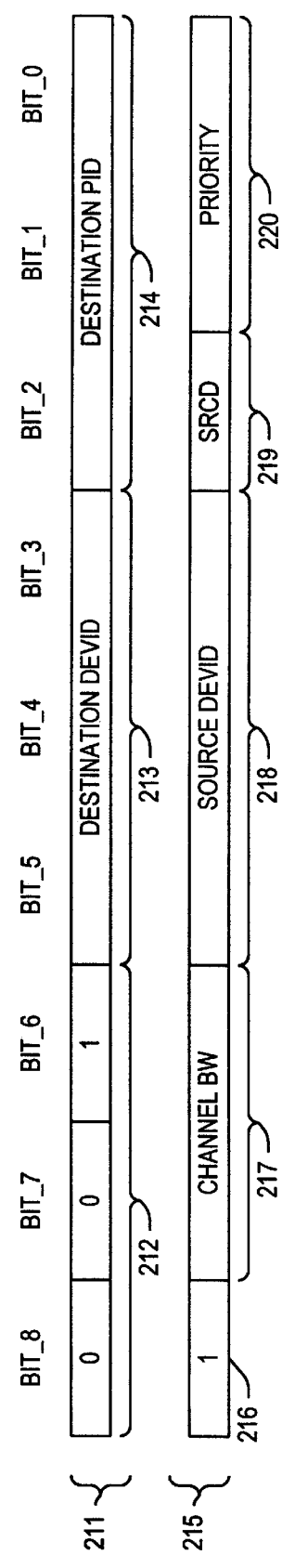
FIG. 4 is a block diagram depicting the field structure of a get resource message (GET_RES message) used in the resource reservation protocol of the present invention.

FIG. 4 shows a block diagram at 210 depicting the field structure of a GET_RES message used in the resource reservation protocol of the present invention. The GET_RES message includes 18 bits and is transmitted via one of the 9 bit control ring segments 24 (FIG. 1) during two cycles of the control ring. The GET_RES message includes: a first nine-bit string 211 having a 3-bit message field 212 which carries a value "001" to identify the message as a GET_RES message, a 3-bit destination device ID field 213 indicating the destination device of a corresponding interconnect transaction, and a 3-bit destination port ID field 214 indicating the destination port of the destination device of the corresponding interconnect transaction; and a second nine-bit string 215 having a single-bit 206 carrying a value of "1", a 2-bit channel bandwidth field 217 further explained below, a 3-bit source device ID field 218 indicating the source device of the corresponding interconnect transaction, a 1-bit source-passed field 219 indicating whether the GET_RES message has been transferred, via the control ring, past the source device of the corresponding interconnect transaction, and a priority field 220 indicating whether the interconnect transaction corresponding to the GET_RES message should be given priority in bandwidth resource arbitration processes performed by devices receiving the GET_RES message as further explained below. When the GET_RES message is transferred, via the control ring, to the source device of the corresponding interconnect transaction, the control ring message pass-by processing unit 70 (FIG. 2A) of the source device sets the 1-bit source-passed field 209 to indicate that the GET_RES message has passed the source device. Before the GET_RES message passes the source device, the source-passed field 209 carries a value of zero to indicate that the GET_RES message has not passed the source device.

For purposes of initial channel setup, before the GET_RES message has passed the source device, the channel bandwidth field 217 carries a two-bit value indicative of the bandwidth of the destination output port, and after the GET_RES message has passed the source device, the channel bandwidth field 217 carries a value indicative of the bandwidth approved by the source device. For purposes of incrementally increasing the bandwidth after initial channel setup, for high speed destination port transactions, the channel bandwidth field 217 carries a two-bit value indicating that the bandwidth of the identified source-destination channel is to be increased.

FIG. 4 also shows a table at 221 showing the four possible two-bit values carried by the channel bandwidth field 217 and indications corresponding to each value. A value "00" calls for initial setup of a 10 Mbps source-destination channel, a value "01" calls for initial setup of a 100 Mbps source-destination channel, a value "10" calls for a 100 Mbps resolution increment of the bandwidth of an existing source-destination channel, and the value "11" is reserved.

Figure 5:
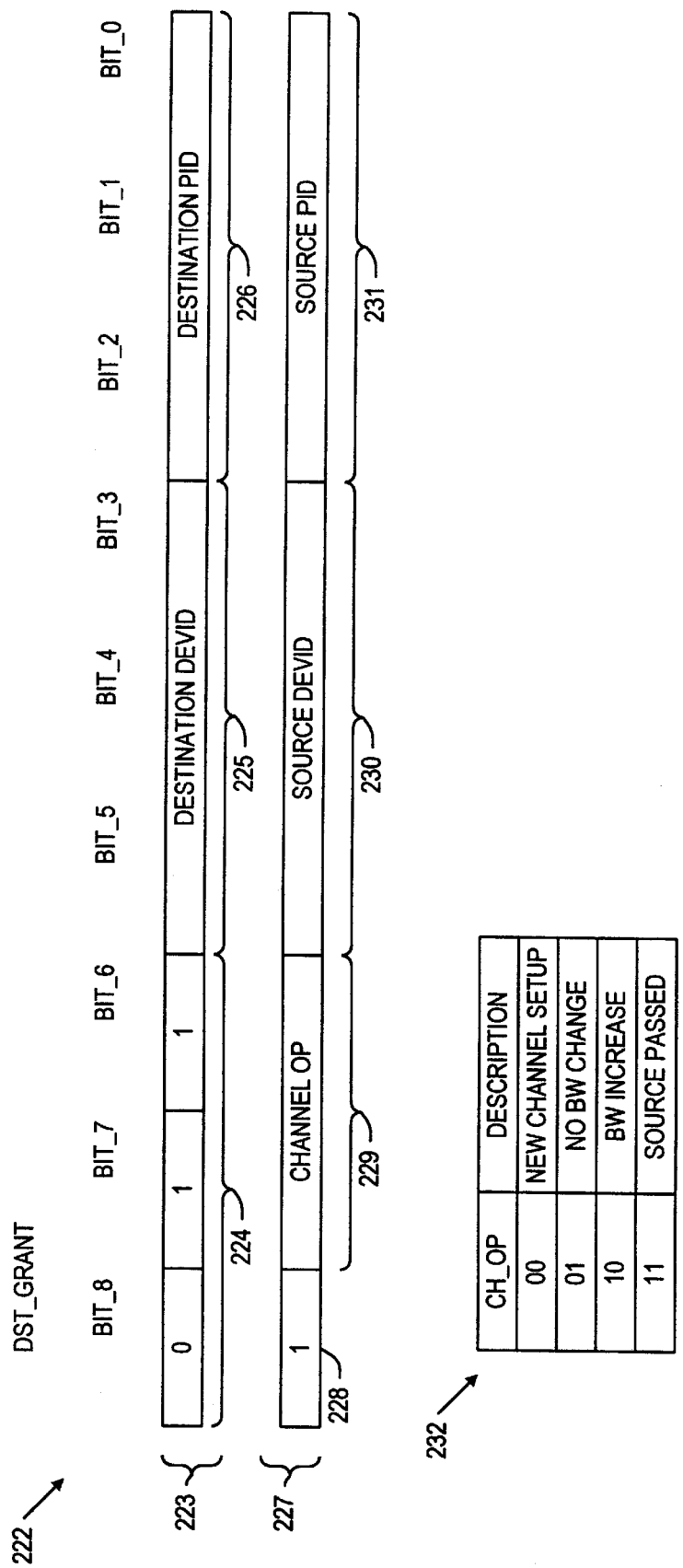
FIG. 5 is a block diagram depicting the field structure of a destination grant message (DST_GRANT message) used in the resource reservation protocol of the present invention.

FIG. 5 shows a block diagram at 222 depicting the field structure of a DST_GRANT message used in the resource reservation protocol of the present invention. The DST_GRANT message includes 18 bits and is transmitted via one of the 9 bit control ring segments 24 (FIG. 1) during two cycles of the control ring. The DST_GRANT message includes: a first nine-bit string 223 having a 3-bit message field 224 which carries a value "011" to identify the message as a DST_GRANT message, a 3-bit destination device ID field 225 indicating the destination device of a corresponding interconnect transaction on the switching fabric 10 (FIG. 1) of the present invention, and a 3-bit destination port ID field 226 indicating the destination port of the destination device of the corresponding interconnect transaction; and a second nine-bit string 227 having a single-bit 228 carrying a value of "1", a 2-bit channel operation field 229 indicating a type of channel modification to be made to the corresponding source-destination channel, a 3-bit source device ID field 230 indicating the source device of the corresponding interconnect transaction, and a 3-bit source port ID field 231 indicating the source port of the source device of the corresponding interconnect transaction.

FIG. 5 also shows a table at 232 showing the four possible two-bit values carried by the channel operation field 229 and indications corresponding to each value. A value "00" calls for new channel setup, a value "01" calls for no bandwidth change of an existing source-destination channel, a value "10" calls for a 100 Mbit/S resolution increment of the bandwidth of an existing source-destination channel, and the value "11" is used to indicate to pass-by devices that the DST_GRANT message has been propagated past the source device only if the original value carried by the channel operation field 229 called for a new channel setup. If the original value carried by the channel operation field 229 called for no bandwidth change of an existing source-destination channel, or an increment of the bandwidth of an existing source-destination channel, then internal channel status registers of the pass-by device are used to determine that the pass-by node is in the previously established source-destination path.

FIG. 6 shows at 234 a block diagram depicting the field structure of a RLS_RES message used in the resource reservation protocol of the present invention. The RLS_RES message includes 18 bits and is transmitted via one of the 9 bit control ring segments 24 (FIG. 1) during two cycles of the control ring. The RLS_RES message includes: a first nine-bit string 235 having a 3-bit message field 236 which carries a value "010" for identifying the message as a RLS_RES message, a 3-bit destination device ID field 237 indicating the destination device of a corresponding interconnect transaction, and a 3-bit destination port ID field 238 indicating the destination port of the destination device of the corresponding interconnect transaction; and a second nine-bit string 239 having a single-bit 240 carrying a value of "1", a 2-bit channel bandwidth field 241 further explained below, a 3-bit source device ID field 242 indicating the source device of the corresponding interconnect transaction, a 1-bit source passed field (SRCD field) 243 indicating whether the RLS_RES message has been transferred from the originating destination device, via the control ring, past the source device of the corresponding interconnect transaction, a one-bit reserved field 244, and a one-bit clear field 245 which is further explained below.

When the RLS_RES message, which is transferred from the originating destination device via the control ring, reaches the source device, the control ring message pass-by processing unit 70 (FIG. 2A) of the source device sets the 1-bit SRCD field 243 to indicate that the RLS_RES message has passed the source device. Before the RLS_RES message passes the source device, the SRCD field 243 carries a value of zero.

For purposes of canceling channel setup, the channel bandwidth field 241 carries a two-bit value indicative of the bandwidth to be released. For purposes of canceling a bandwidth increment request, the channel bandwidth field 241 carries a two-bit value indicative of the bandwidth carried in the previous request. FIG. 6 also shows a table at 246 showing the four possible two-bit values carried by the channel bandwidth field 241 and indications corresponding to each value. A value "00" calls for canceling a 10 Mbps source-destination channel, a value "01" calls for canceling a 100 Mbps source-destination channel, a value "10" calls for canceling a 100 Mbit/S resolution increment of the bandwidth of an existing source-destination channel for a high speed destination port interconnect transaction, and the value "11" is reserved.

FIG. 7 shows at 248 a block diagram depicting the field structure of an IDLE message used in the resource reservation protocol of the present invention. The IDLE message includes 9 bits, each set to a value of "1", and is transmitted via one of the 9 bit control ring segments 24 (FIG. 1) during a single cycle of the control ring.

Upon receiving a protocol control message at a switching device (FIGS. 2A and 2B) via the control ring input 22, the control ring receiving unit 60 (FIG. 2A) makes preliminary determinations including: reading the first three bits of the message which indicate the type of message received; comparing the source and destination device ID fields of the message to the local device ID; and checking the SRCD field of the message (if the message is a GET_RES message or RLS_RES message). If the message received is a GET_RES message or RLS_RES message, and if the SRCD field of the message indicates that the message has not passed the source device, and if the source device ID field of the message does not match the local device ID, its is assumed that the current device is not in the path of the source-destination channel specified by the message and the control ring receiving unit 60 (FIG. 2A) transfers the message directly to the control ring message pass-by processing unit 70 which transfers the message downstream on the control ring via the control ring transmitting unit 80 (FIG. 2A).

Figure 8A:
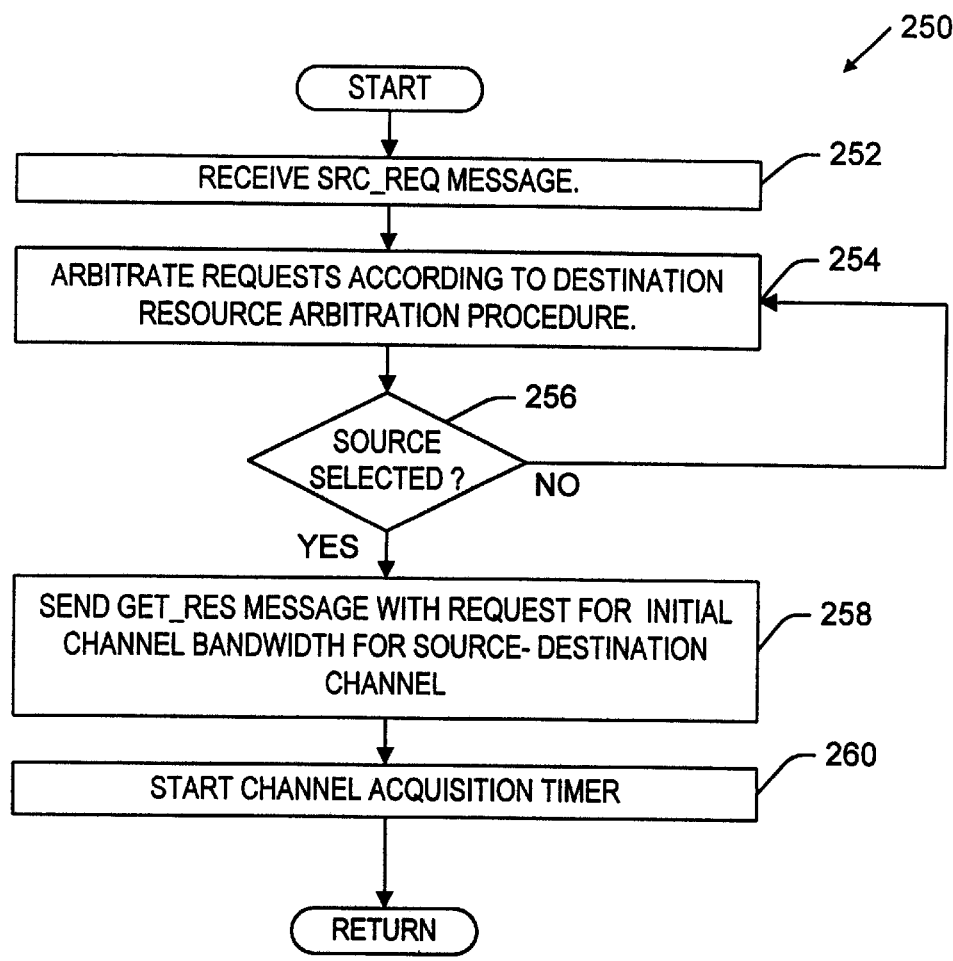
FIGS. 8A through 8E are flow diagrams depicting destination stage behavioral processes of a switching device of the packet switching fabric of FIG. 1.

FIG. 8A shows a flow diagram at 250 depicting a destination stage behavioral process of a device of the packet switching fabric 10 (FIG. 1) in response to receiving a SRC_REQ message 200 (FIG. 3). The depicted process begins with step 252 in which the destination device receives a SRC_REQ message at the control ring receiving unit 60 (FIG. 2A). The control ring receiving unit reads the SRC_REQ message and compares the local device ID to the destination device ID and source device ID specified in fields 203 and 208 (FIG. 3) of the SRC_REQ message. If the local device ID matches the destination device ID specified in field 203 of the SRC_REQ message, it is assumed that the SRC_REQ message has arrived at the specified destination device, and the control ring receiving unit 60 passes the SRC_REQ message to the CRMT processing unit 100 (FIG. 2A) which stores the received SRC_REQ message in a source request buffer. The depicted process proceeds from step 252 to step 254 in which the CRMT processing unit 100 arbitrates between one or more SRC_REQ messages temporarily stored in the source request buffer according to a destination resource arbitration procedure. If the packet priority field 207 (FIG. 3) of the SRC_REQ message indicates that source priority should be given to the interconnect transaction associated with the current SRC_REQ message, then the arbitration procedure will give priority to the current SRC_REQ message. It is then determined at 256 whether or not the current SRC_REQ message received in step 252 has been selected by the arbitration procedure performed in step 254. The depicted repeats steps 254 and 256 until the current SRC_REQ message has been selected.

After it is determined at 256 that the current SRC_REQ message has been selected for processing by the destination device, the process proceeds to step 258 in which the CRMT processing unit 100 (FIG. 2A) transmits a GET_RES message 210 (FIG. 4), down stream via the control ring transmitting unit 80 and output 26 (FIG. 2A), with the channel bandwidth field 217 (FIG. 4) of the GET_RES message indicating a request for data ring bandwidth resources for initial setup of a source-destination channel associated with the interconnect transaction originally specified by the SRC_REQ message received in step 252. The depicted process then proceeds to step 260 in which the CRMT processing unit 100 (FIG. 2A) starts a channel acquisition timer which is set to expire after a predetermined maximum time period. As further explained below, the channel acquisition timer is reset upon return of the GET_RES to the current destination device message which confirms the bandwidth resource request specified by the GET_RES message sent in step 258. After executing step 260, the depicted process returns.

Figure 8B:
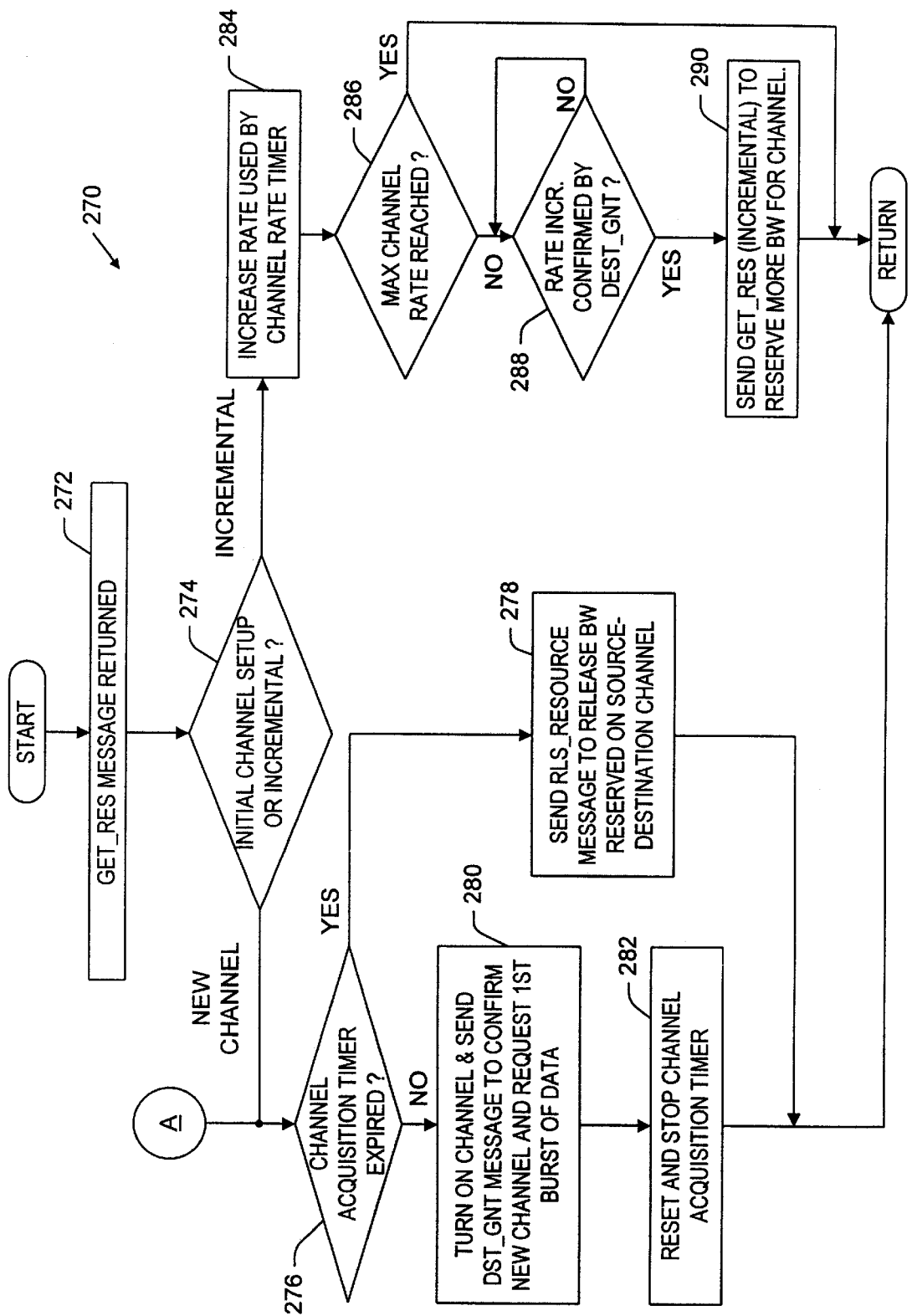

FIG. 8B shows a flow diagram at 270 depicting a destination stage behavioral process of one of the devices of the packet switching fabric of the present invention in response to the return of a GET_RES message to the originating destination device after having been sent around the control ring. Upon receiving a GET_RES message 210 (FIG. 4) at any device of the switching fabric 10 (FIG. 1), if the SRCD field 219 (FIG. 4) of the GET_RES message indicates that the GET_RES message has passed the source device, and the destination port ID field 214 of the GET_RES message matches a local port ID, it is assumed that the GET_RES message has returned to the originating destination device from which the GET_RES message originated. The depicted process begins with step 272 in which a GET_RES message 210 (FIG. 4), having been sent originally by the destination device, is returned to the destination device via the control ring. The depicted process proceeds from step 272 to 274 at which the CRMT processing unit 100 (FIG. 2A) of the destination device reads the channel bandwidth field 217 (FIG. 4) of the GET_RES message 210 to determine whether the bandwidth resources requested by the GET_RES message are for initial channel set-up or for incremental increase of an existing source-destination channel (for a high speed destination port interconnect transaction). As explained above, before the GET_RES message has passed the source device, the channel bandwidth field carries a value indicative of the bandwidth of the destination output port, and after the GET_RES message has passed the source device, the channel bandwidth field carries a value indicative of the bandwidth approved by the source device.

If it is determined at 274 that the GET_RES message is for an initial channel set-up (field 217 carries a value of "00", or "01"), the depicted process proceeds to 276 at which it is determined whether the channel acquisition timer, set by the originating destination device upon the original transmission of the GET_RES message (step 260 of FIG. 8A), has expired. If it is determined at 276 that the channel acquisition timer has expired, the depicted process proceeds to step 278 at which the CRMT processing unit 100 (FIG. 2A) of the destination device initiates transmission of a RLS_RES message 234 (FIG. 6) downstream via the control ring transmitting unit 80 (FIG. 2A), to release bandwidth reserved on the source-destination channel associated with the GET_RES message returned in step 272. The channel bandwidth field 241 (FIG. 6) of the RLS_RES message sent in step 278 indicates the bandwidth resources to be released.

If it is determined at 276 that the channel acquisition timer has not expired, the process proceeds to step 280 in which the channel bandwidth resource manager 90 (FIG. 2A) of the destination device turns on the source-destination channel specified by the GET_RES message returned in step 272. Also, in step 280, the CRMT processing unit 100 (FIG. 2A) of the destination device initiates transfer of a DST_GRANT message downstream via the control ring transmitting unit 80 (FIG. 2A) to confirm bandwidth allocation for the new channel and also to request a first burst of packet data from the source device. From step 280, the process proceeds to step 282 in which the CRMT unit 100 (FIG. 2A) resets the channel acquisition timer, after which the process returns.

If it is determined at 274 that the GET_RES message returned in step 272 requests an incremental increase of the bandwidth allocated for an existing source-destination channel, the process proceeds to step 284 in which the CRMT processing unit 100 (FIG. 2A) of the destination device increases the rate of a channel rate timer which controls the rate at which DST_GRANT messages are sent by the destination device for requesting bursts of data from the source device. After a source destination channel is setup, the effective data transfer rate via the channel is controlled by the frequency at which DST_GRANT messages are sent from the destination to the source to request data bursts, which is controlled by the channel rate timer. From step 284, the process proceeds to step 286 at which it is determined whether the maximum channel rate has been reached. For high speed network port switching devices 30 (FIG. 2B), the maximum channel rate is proportional to the 1 Gbps. maximum bandwidth of the high speed ETHERNET network links 33 (FIG. 1). If it is determined at 286 that the maximum channel rate has been reached, the depicted process returns.

If it is determined at 286 that the maximum channel rate has not been reached, the process proceeds to 288 at which it is determined whether the rate increase has been confirmed by a DST_GRANT signal being transmitted by the current destination device to confirm the rate increase. The determination at 288 is repeated until the CRMT processing unit 100 (FIG. 2A) of the destination device transmits a DST_GRANT message down stream via the control ring to confirm the channel rate increase, after which the process proceeds to step 290 in which the CRMT processing unit 100 sends a GET_RES message 210 (FIG. 4) to reserve more bandwidth for the source-destination channel. The GET_RES message sent in step 280 has its channel bandwidth field 217 set to a value "10" to indicate that an incremental increase is requested by the GET_RES message. After executing step 290, the process returns.

Figure 8C:
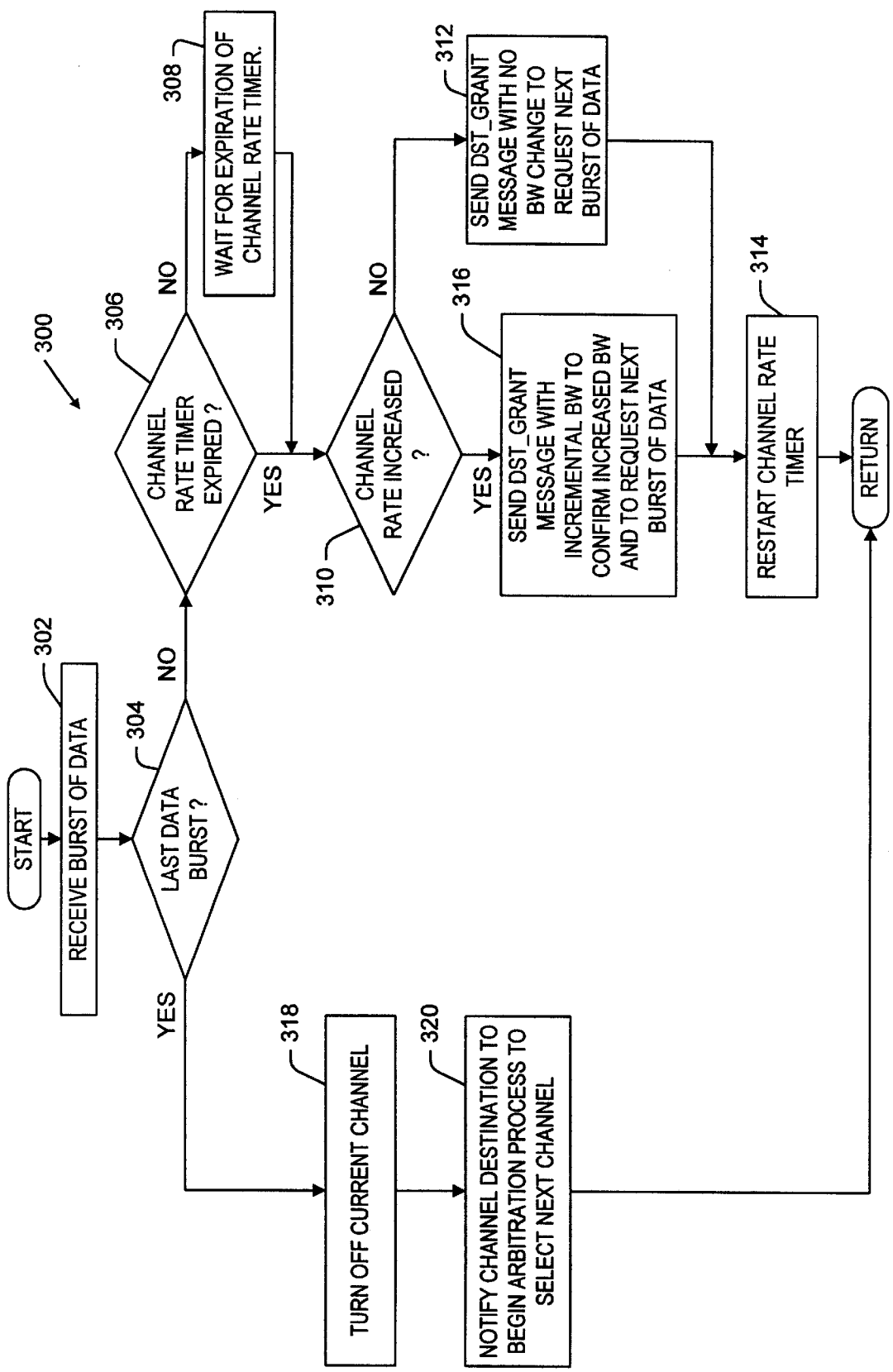

FIG. 8C shows a flow diagram at 300 depicting a destination stage behavioral process of a switching device of the packet switching fabric of the present invention in response to receiving a burst of packet data. The depicted process begins with step 302 in which the destination device receives a burst of packet data, after which the process proceeds to 304 at which it is determined whether the burst of packet data received in step 302 is a last burst of packet data. This determination is made by the data ring receive unit 112 (FIG. 2A) of the destination device which reads a block header of the packet data to determine whether an end of packet indication is present in the packet data burst.

If it is determined at 304 that the burst of packet data received in step 302 is not a last burst of packet data, the process proceeds to 306 at which it is determined whether the channel rate timer implemented by the CRMT processing unit 100 (FIG. 2A) of the destination device has expired. If it is determined at 306 that the channel rate timer has not expired, the process proceeds to step 308 and waits for expiration of the channel rate timer. After it is determined at 306 that the channel rate timer has expired, the process proceeds to 310 at which it is determined whether the channel rate has been increased in response to having received a GET_RES message (with its channel bandwidth field 217 (FIG. 4) indicating a request for incremental bandwidth) since receiving a previous burst of packet data. If it is determined at 310 that the channel rate has not been increased since receiving a previous burst of packet data, the process proceeds to step 312 at which the termination processing unit 100 (FIG. 2A) of the destination device sends a DST_GRANT message 222 (FIG. 5) with no bandwidth change indicated in its channel operation field 229 (FIG. 5) to request a next burst of packet data. From step 312, the process proceeds to step 314 in which the termination processing unit 100 (FIG. 2A) of the destination device restarts the channel rate timer.

If it is determined at 310 that the channel rate has been increased, in response to having received a GET_RES message with the channel bandwidth field 217 (FIG. 4) indicating a request for increased bandwidth, since receiving a previous burst of packet data, the process proceeds from 310 to step 316 in which the CRMT processing unit 100 of the destination device sends a DST_GRANT message with incremental bandwidth (the channel bandwidth field carries a value="10") to confirm the increased bandwidth, and to request a next burst of packet data. From step 316, the process proceeds to step 314 in which the termination processing unit restarts the channel rate timer, after which the depicted process returns.

Figure 8E:
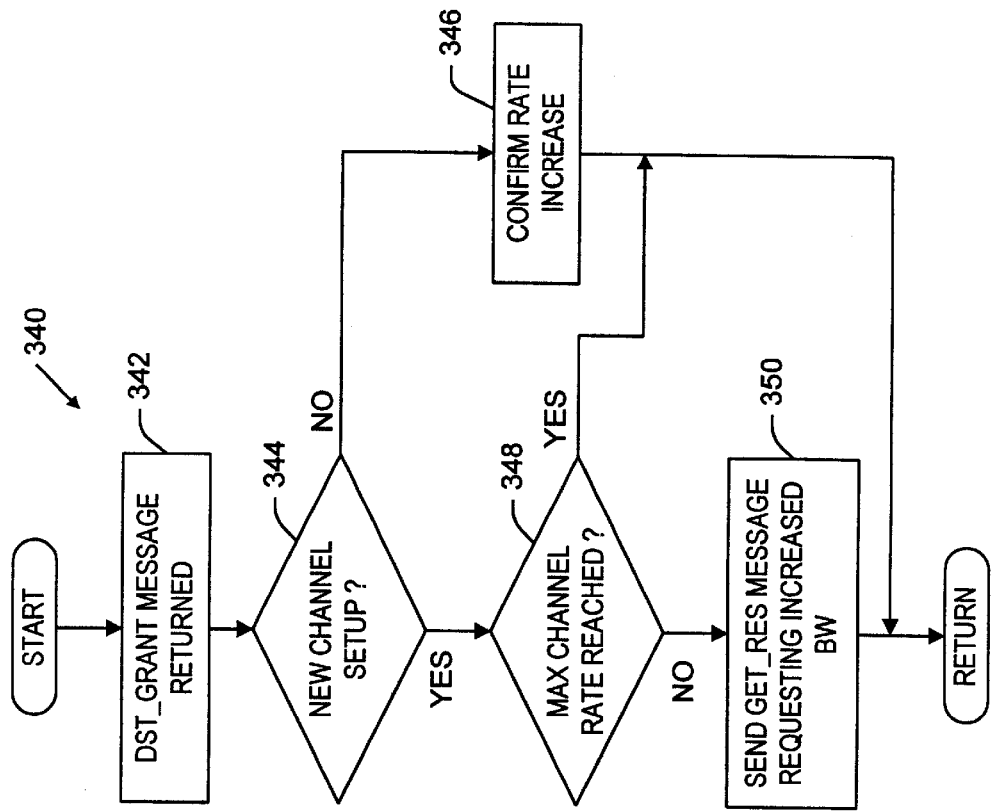
Figure 8D:
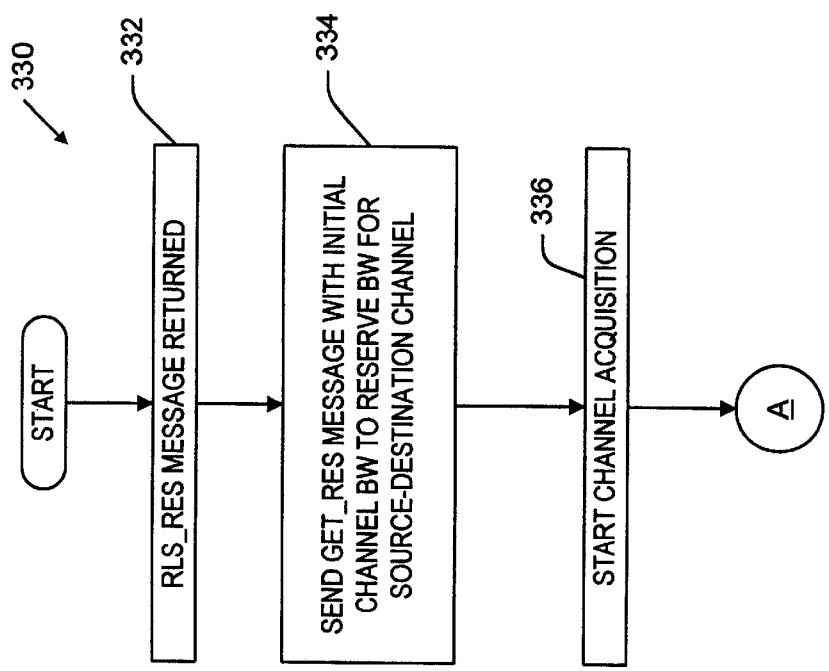

FIG. 8D shows a flow diagram at 330 depicting a destination stage behavioral process of a switching device of the packet switching fabric of the present invention in response to the return of a RLS_RES message to the originating destination device. Upon receiving a RLS_RES message 234 (FIG. 6), if the SRCD field 243 of the RLS_RES message indicates that the RLS_RES message has passed the source device, and the destination port ID field 238 (FIG. 6) matches one of the local port ID's, it is assumed that the RLS_RES message is at the originating destination device where it will be terminated. In step 332, a RLS_RES message 234 (FIG. 6) is returned to, and terminated at, its originating destination device. As described in step 278 (FIG. 8B), RLS_RES messages are sent by destination devices upon expiration of the channel acquisition timer before the associated channel is setup.

From step 332, the process proceeds to step 334 in which the CRMT processing unit 100 (FIG. 2A) of the destination device sends a GET_RES message with initial channel bandwidth to reserve bandwidth for a new source-destination channel. After executing step 334, the depicted process proceeds to step 336 in which the CRMT processing unit 100 (FIG. 2A) of the destination device starts the channel acquisition timer, after which the process proceeds to 276 (FIG. 8B).

FIG. 8E shows a flow diagram at 340 depicting a destination stage behavioral process of a device of the packet switching fabric in response to the return of a DST_GRANT message 222 (FIG. 5) to its originating destination device, as specified in an initial step 342. From step 342, the process proceeds to step 344 in which the CRMT processing unit 100 (FIG. 2A) reads the channel operation field 229 (FIG. 5) of the DST_GRANT message to determine whether the DST_GRANT message confirm a new channel set-up or an incremental change in the bandwidth of an existing source-destination channel.

If it is determined at 344 that the DST_GRANT message received in 342 confirms an incremental change in the bandwidth allocated for an existing channel, the process proceeds to 346 in which the channel bandwidth resource manager 90 (FIG. 2A) of the destination device confirms the rate increase by increasing the corresponding bandwidth counter.

If it is determined at 344 that the DST_GRANT message received in 342 is confirming a new channel set-up, the process proceeds to 348 in which the bandwidth resource manager 90 (FIG. 2A) of the destination device determines whether the maximum channel rate has been reached. For high speed destination port interconnect transactions wherein the destination port is one of the high speed network ports 32 (FIG. 1) of switch 30, the maximum channel rate of the channel rate timer if is limited only by the maximum data ring bandwidth and maximum packet buffer bandwidth. If it is determined at 348 that the maximum channel rate has been reached, the process returns. If it is determined at 348 that the maximum channel rate has not been reached, the process proceeds to step 350 in which the CRMT processing unit 100 (FIG. 2A) transmits a GET_RES message 210 (FIG. 4) with its channel bandwidth field 217 indicating a request for an increment in bandwidth, after which the process returns.

Figure 9A:
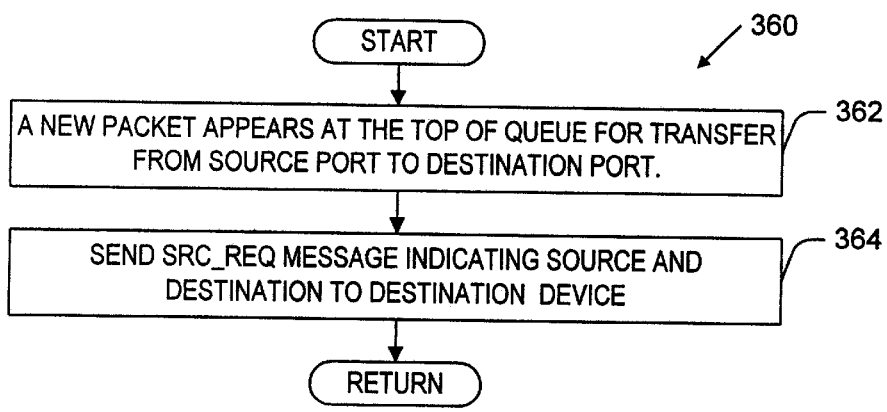
FIGS. 9A through 9E are flow diagrams depicting source stage behavioral processes of a switching device of the packet switching fabric of FIG. 1.

FIG. 9A shows a flow diagram at 360 depicting source behavior of a switching device of the packet switching fabric of the present invention in response to a new packet appearing at the top of a queue. For example, a data packet received via a network port and stored in the external packet buffer 168 (FIG. 2B) appears at the top of the internal FIFO 162 (FIG. 2B) and is provided to the input queuing control unit 152 which reads the header information of the data packet to determine whether the destination of the data packet is a network node connected to one of the network ports of the local device, or a network node connected to one of the network ports of another device of the packet switching fabric. If the header information of the information packet indicates that the data packet is to be transferred from the source device to a destination port of a destination device, the interconnect transaction is not local and the resource reservation protocol is used to setup a channel between the source and destination. From step 362 the depicted process proceeds to step 364 in which the CRMT processing unit 100 of the source device sends a GET_RES message indicating the source device, destination device, destination port and required bandwidth resources after which the depicted process returns.

Figure 9B:
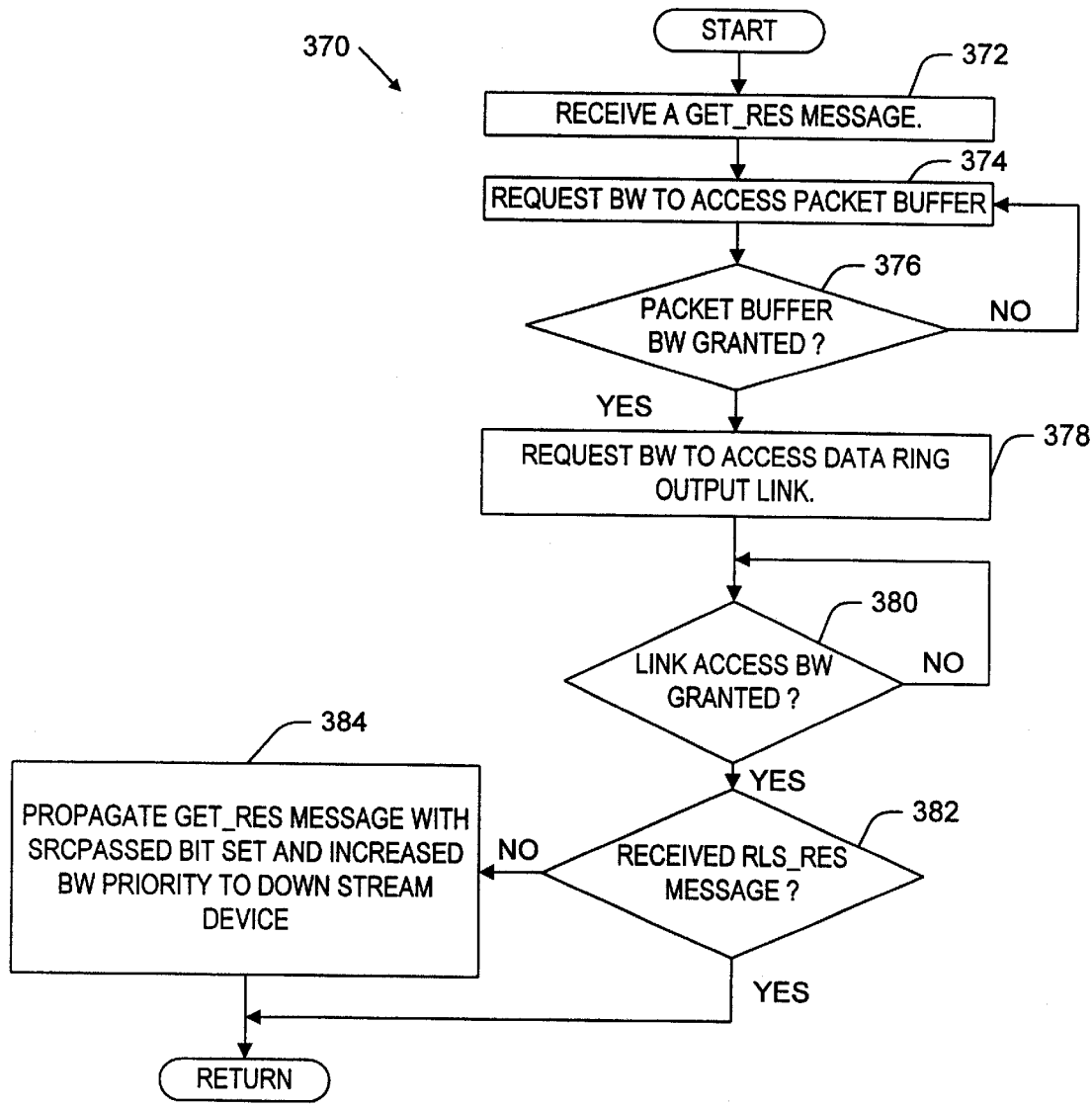

FIG. 9B shows a flow diagram at 370 depicting a source stage behavioral process of a switching device of the packet switching fabric of the present invention in response to receiving a GET_RES message in step 372. Upon receiving a GET_RES message 210 (FIG. 4) at a device of the switching fabric, if the SRCD field 219 (FIG. 4) of the GET_RES message indicates that the GET_RES message has not passed the source device, and the source device ID field 218 of the GET_RES message matches the local device ID, it is assumed that the GET_RES message is currently at the source device. The SRC_REQ message 200 (FIG. 3), having been received via the control ring receiving unit 60 (FIG. 2A) of the source device, is then transferred to the CRMT processing unit 100 (FIG. 2A) where it is temporarily parked in a buffer. The CRMT processing unit 100 of the source device reads the channel bandwidth field 217 (FIG. 4) of the GET_RES message to determine the requested bandwidth which is dictated by the bandwidth of the destination port associated with the GET_RES message. The CRMT processing unit 100 then communicates with the channel bandwidth resource manager 90 (FIG. 2A) to negotiate required bandwidth to access the packet buffer 168 (FIG. 2A) and internal FIFO 162, and to transmit data via the data ring as described above. As mentioned, the channel bandwidth resource manager 90 controls the packet buffer channel bandwidth allocated for transfer of data between the external packet buffer and the internal FIFO 162, and also controls the data ring interface bandwidth allocated for transfer of data between the data ring transmit and upload control unit 126 and the data ring output 20 of the device. In step 374 the CRMT processing unit 100 (FIG. 2A) requests the channel bandwidth resource manager 90 to grant bandwidth to access the external packet buffer 168. It is then determined at 376 whether the sufficient bandwidth has been granted by the bandwidth resource manager 90 to access the external packet buffer.

If it is determined at 376 that sufficient packet buffer channel bandwidth has not been granted, the process repeats steps 374 and 376 until the packet buffer channel bandwidth has been granted, after which the process proceeds to step 378 in which the CRMT processing unit 100 requests the channel bandwidth resource manager 90 to allocate data ring output link bandwidth for transferring associated data between the data ring transmit and upload control unit 126 and the data ring output 20 of the source device. It is then determined at 380 whether the link access bandwidth requested in step 378 has been granted by the channel bandwidth resource manager. If it is determined at 380 that the channel bandwidth resource manager has granted the link access bandwidth, the process proceeds to step 382 in which it is determined whether a RLS_RES message has been received by the source device.

If it is determined at 382 that a RLS_RES message has not been received, the CRMT processing unit 100 sets the SRCD bit 219 (FIG. 4) of the GET_RES message 210 to indicate that the GET_RES message has passed the source device and modifies the priority field 220 (FIG. 4) of the GET_RES message to indicate that bandwidth priority is requested, after which the GET_RES message is provided to the control ring via the control ring transmitting unit 80 (FIG. 2A) by the CRMT processing unit 100, and the GET_RES message is propagated downstream. After executing step 384, the depicted process returns.

Figure 9C:
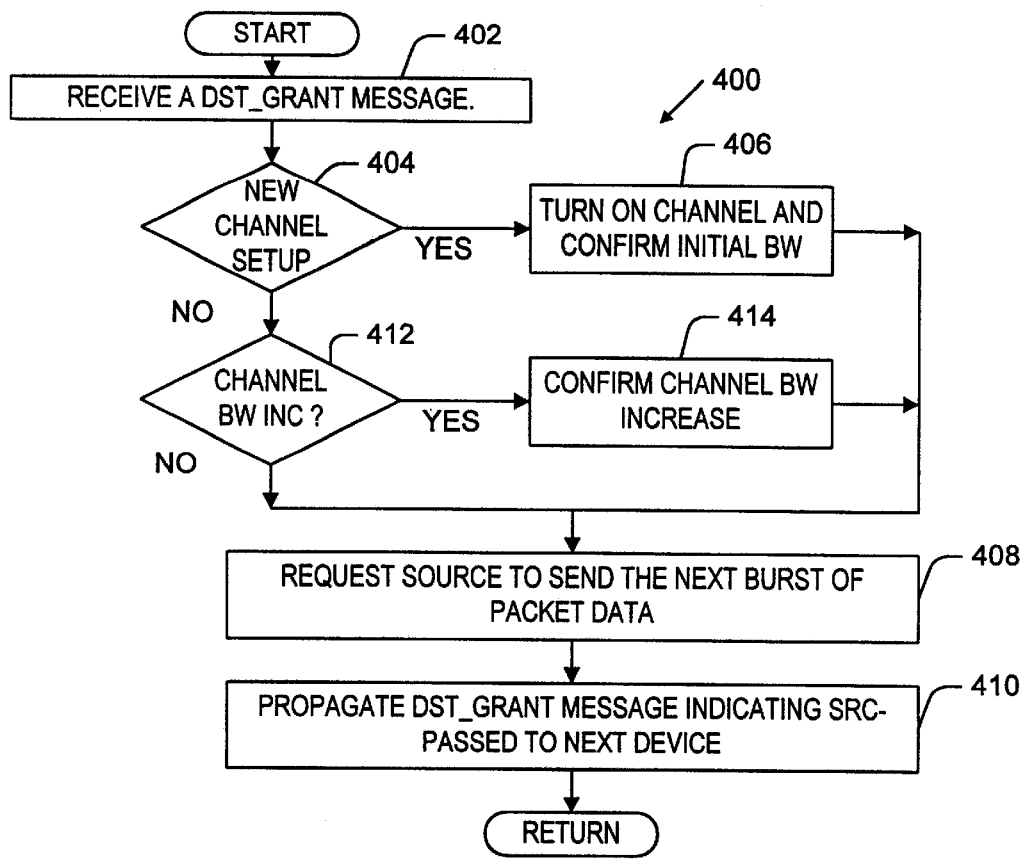

FIG. 9C shows a flow diagram at 400 depicting a source stage behavioral process of one of the switching devices of the packet switching fabric of the present invention in response to receiving a DST_GRANT message in an initial step 402 of the depicted process. From step 402, the depicted process proceeds to 404 at which the CRMT processing unit 100 (FIG. 2A) of the source device reads the channel operation field 229 (FIG. 5) of the DST_GRANT message 222 to determine whether the DST_GRANT message sent by the associated destination device is confirming the set-up of a new channel. If it is determined at 404 that a new channel set-up is being confirmed, the depicted process proceeds to step 406 in which the channel bandwidth resource manager 90 (FIG. 2A) of the source device turns on the source-destination channel specified by the DST_GRANT message and confirms initial bandwidth, after which the process proceeds to step 408 in which the CRMT processing unit 100 requests the data ring transmit unit and upload control unit 126 (FIG. 2A) to transfer the next burst of packet data from the source device to the destination port via the data ring.

From step 408, the process proceeds to step 410 in which the CRMT processing unit 100 (FIG. 2A) of the source device propagates the DST_GRANT message 222 (FIG. 5), indicating that the source has been passed, to the next device. The channel operation field is marked "11" to indicate that the DST_GRANT message has passed the source only if the channel operation field originally indicated "new channel setup".

It is then determined at 412 whether the channel operation field 229 (FIG. 5) of the DST_GRANT message received instep 402 indicates a channel bandwidth increase. If it is determined at 412 that the channel operation field indicates a channel bandwidth increase, the process proceeds to step 414 in which the source device confirms the channel bandwidth increase by sending a DST_GRANT message 222 (FIG. 5) with its channel operation field 232 indicating a channel bandwidth increase, after which the process executes steps 408 and 410 as described above.

Figure 9D:
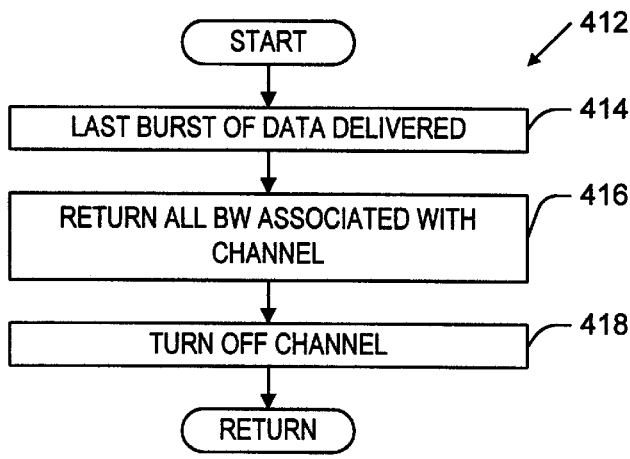

FIG. 9D shows a flow diagram at 412 depicting a source stage behavioral process of a switching device of a packet switching fabric of the present invention in response to delivery of a last burst of packet data for an interconnect transaction. As mentioned above, the end of a data packet (EOP) indication is detected in the data stream. The process begins with step 414 in which a last burst of packet data is transmitted by the source device via the data ring transmit and upload control unit 126 (FIG. 2A), and proceeds to step 416 in which the channel bandwidth resource manager 90 of the source device returns all bandwidth associated with the source-destination channel. In step 418, the bandwidth resource manager turns the source-destination channel off, after which the depicted process returns.

Figure 9E:
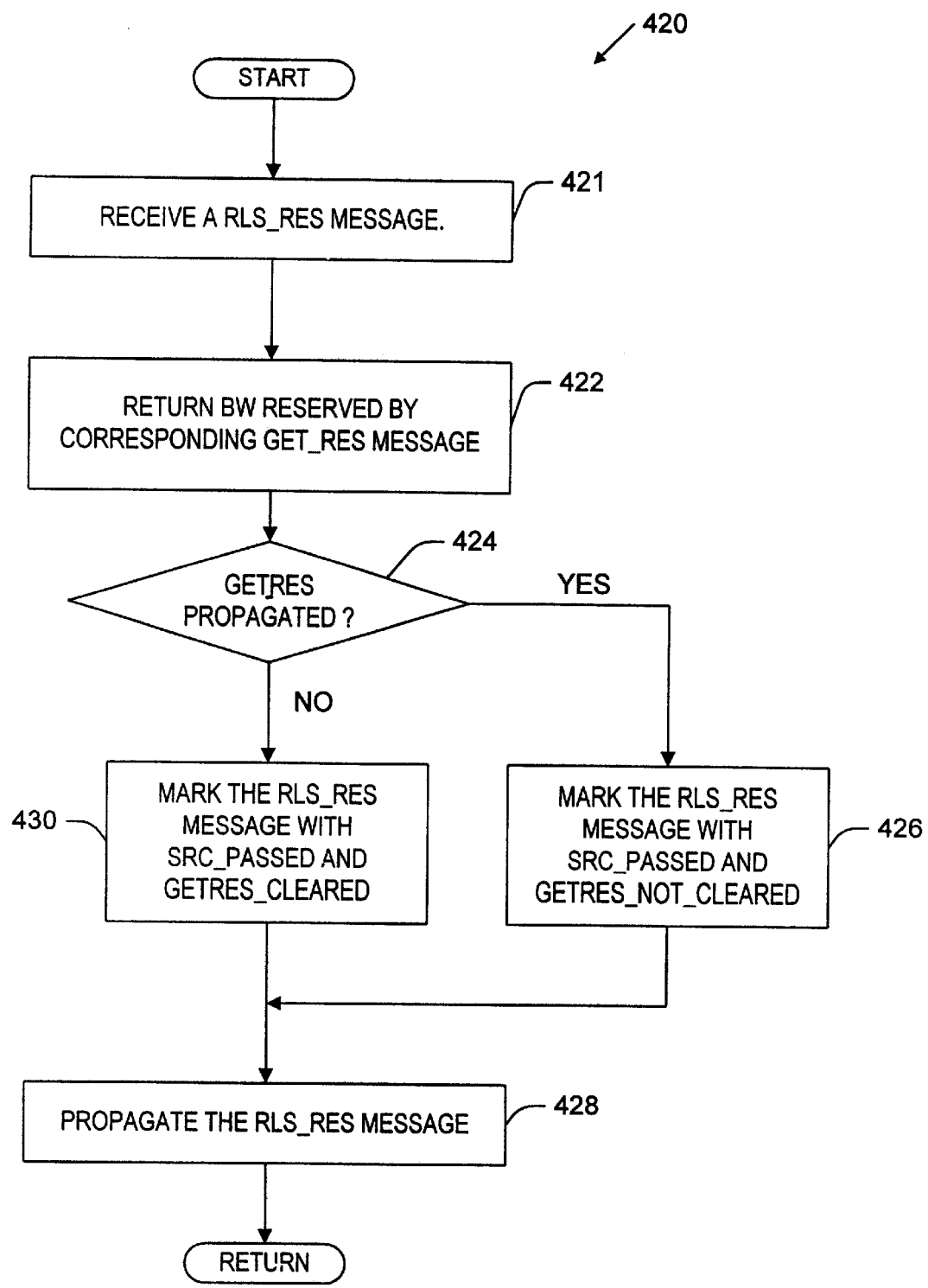

FIG. 9E shows a flow diagram at 420 depicting a source stage behavioral process of a device of a packet switching fabric in response to receiving a RLS_RES message 234 (FIG. 6) in an initial step 421 of the process. From step 421, the process proceeds to step 422 in which the bandwidth resource manager 90 (FIG. 2A) of the source device returns bandwidth previously reserved by a GET RES message corresponding to the RLS_RES message received in step 421. From step 422, the process proceeds to 424 at which it is determined whether the GET_RES message corresponding to the RLS_RES message received in step 421 has been propagated. This determination is necessary because it is possible that the GET_RES message is still stored in a get resource buffer of the CRMT processing unit 100 (FIG. 2A) of the source device as a result of the bandwidth resource manager 90 (FIG. 2A) of the source device not allocating the bandwidth resources specified by the GET_RES message due to heavy traffic. If the GET_RES message has not been propagated, then the bandwidth resources associated with it have not been granted by the current device and there are no allocated resources to be released. However, if the GET_RES message has not been propagated, it must be cleared.

If it is determined at 424 that the GET_RES message has been propagated, the process proceeds to step 426 in which the CRMT processing unit 100 (FIG. 2A) of the source device modifies the SRCD bit field 243 of the RLS_RES message 234 (FIG. 6) to indicate that the source device has been passed, and also modifies the clear field 245 of the RLS_RES message 234 to indicate that the GET_RES message has not been cleared. From step 426, the process proceeds to step 428 in which the CRMT processing unit of the source device transmits the RLS_RES message downstream on the control ring via the control ring transmitting unit 80.

If it is determined at 424 that the GET_RES message associated with the RLS_RES message received in step 421 has not been propagated, the process proceeds to step 430 in which the termination processing unit 100 modifies the SRCD field 243 of the RLS_RES message 234 (FIG. 6) to indicate that the RLS_RES message has passed the source device, and also modifies the clear field 245 (FIG. 6) of the RLS_RES message to indicate that the associated GET_RES message has been cleared. This enables downstream devices to determine that the GET_RES message associated with the RLS_RES message was never transmitted to those downstream devices. From step 430, the process proceeds to execute step 428 as described above.

Figure 10A:
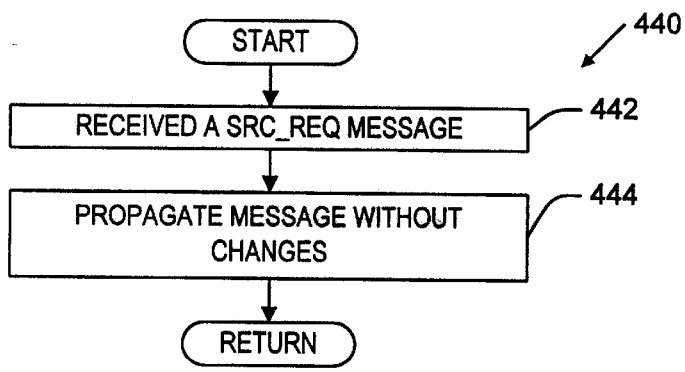
FIGS. 10A through 10E are flow diagrams depicting pass-by stage behavioral processes of a switching device of the packet switching fabric of FIG. 1.

FIG. 10A shows a flow diagram at 440 depicting a pass-by stage behavioral process of one of the devices of the packet switching fabric 10 (FIG. 1) in response to receiving a SRC_REQ message 200 (FIG. 3). In step 442, the control ring receiving unit 60 (FIG. 2A) of the pass-by device receives a control ring message and reads the first three bits of the message to determine that the message is a SRC_REQ message 200 (FIG. 3). From step 442, the process proceeds to execute step 444 in which the control ring receiving unit passes the SRC_REQ message to the control ring message pass-by processing unit 70 (FIG. 2A) which transfers the message to the control ring output 26 of the switching device via the control ring transmitting unit 80 without modifications to the message. After executing step 444, the depicted process returns.

Figure 10B:
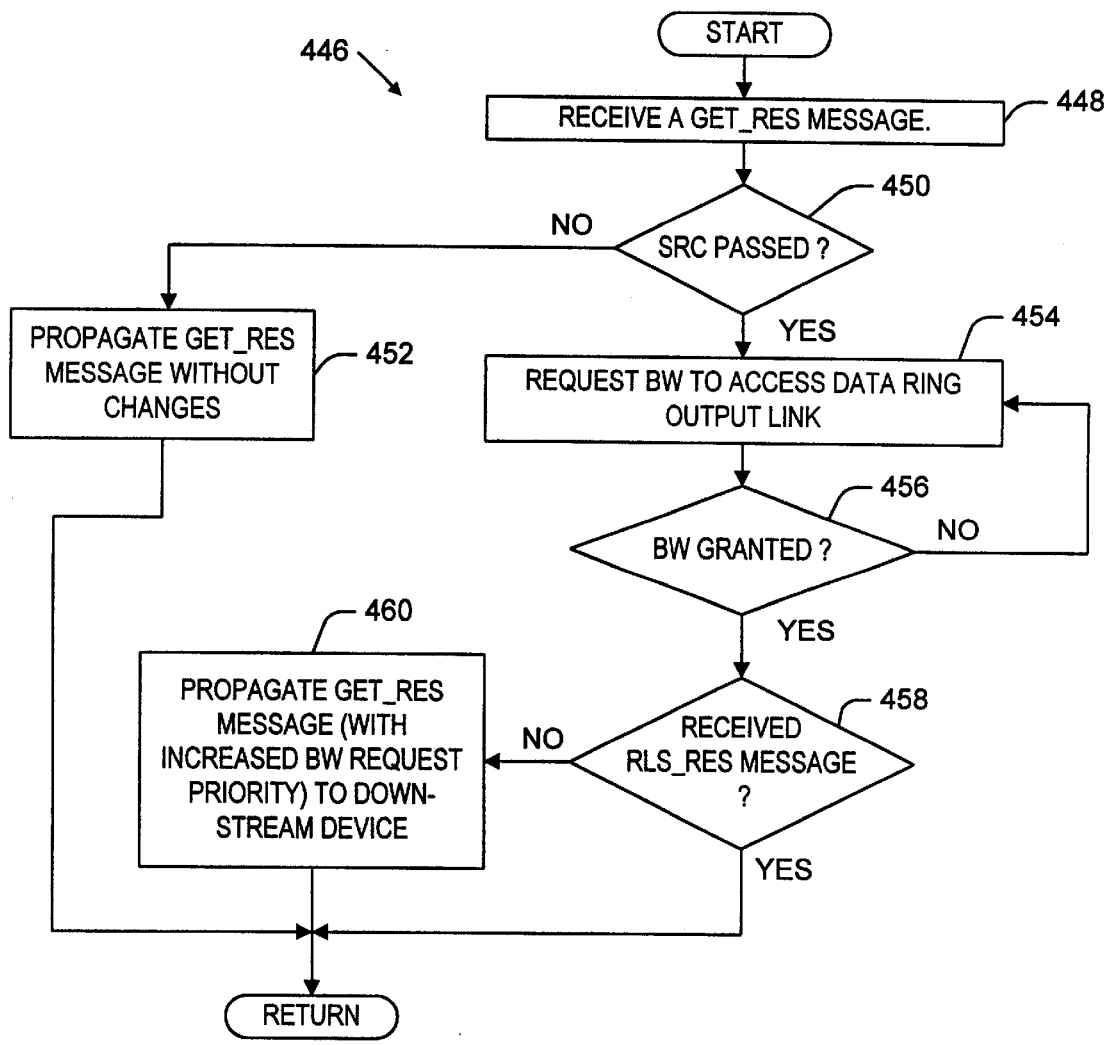

FIG. 10B shows a flow diagram at 446 depicting a pass-by stage behavioral process of a devices of the packet switching fabric in response to receiving a GET_RES message. In step 448, the control ring receiving unit 60 (FIG. 2A) reads fields of the GET_RES message including the SRCD field 219 (FIG. 4) of the GET_RES message 210. From step 448, the process proceeds to 450 at which the control ring receiving unit 60 determines whether the GET_RES message received in step 448 has passed the specified source device. If it is determined at 450 that the GET_RES message has not passed the source device, the process proceeds to step 452 in which the control ring message pass-by processing unit 70 (FIG. 2A) propagates the GET_RES message via the control ring without changes. Alternatively if it is determined at 450 that the GET_RES message received in step 448 has passed the source device, the process proceeds to step 454 in which the control ring receiving unit transfers the GET_RES message to the CRMT processing unit 100 (FIG. 2A) which requests the channel bandwidth resource manager 90 to allocate data ring bandwidth sufficient to satisfy the bandwidth requirements requested by the GET_RES message as indicated by the channel bandwidth field 217 (FIG. 4) of the GET_RES message. From step 454 the process proceeds to 456 at which the CRMT processing unit 100 communicates with the bandwidth resource manager 90 to determine whether the bandwidth requested in step 454 has been allocated. The process repeats step 454 and the determination at 456 until the bandwidth requested by the GET_RES message has been allocated by the channel bandwidth resource manager of the pass-by device, after which it is determined at 458 whether the current pass-by device has received a RLS_RES message corresponding to the GET_RES message received in step 448.

If it is determined at 458 that the current pass-by device has previously received a RLS_RES message corresponding with the current GET_RES message, the process returns without taking any further action. If it is determined at 458 that the current pass-by device has not received a RLS_RES message, the process proceeds to step 460 in which the CRMT processing unit 100 (FIG. 2A) of the pass-by device modifies the priority field 220 (FIG. 4) of the GET_RES message to indicate to channel bandwidth resource managers of downstream switching devices that priority is to be given in allocating bandwidth resources specified by the current GET_RES message because prior upstream devices have already allocated bandwidth resources for the current GET_RES message and these should not be wasted. After modifying the priority field of the GET_RES message, the CRMT processing unit of the pass-by device transfers the GET_RES message downstream via the control ring, after which the process returns.

Figure 10C:
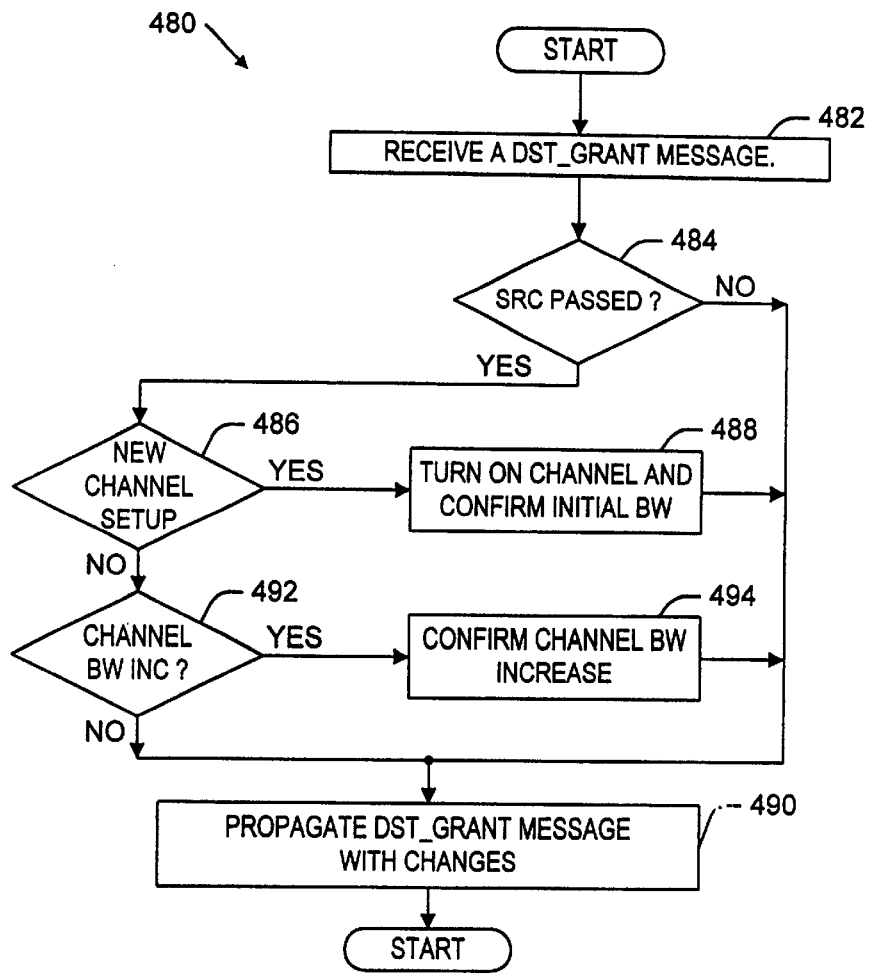

FIG. 10C shows a flow diagram at 480 depicting a pass-by stage behavioral process of a switching device of the switching fabric 10 (FIG. 1) in response to receiving a DST_GRANT message 222 (FIG. 5). After receiving a DST_GRANT message in step 482, the process proceeds to step 484 at which the CRMT processing unit 100 (FIG. 2A) of the pass-by device determines whether the DST_GRANT message has passed the specified source device. The objective of the determination at 484 is to determine if the pass-by device is in the source destination channel path. The CRMT processing unit of the pass-by device determines that the DST_GRANT message has passed the source device if the channel operation field 229 (FIG. 5) carries a value of "11" as described above. The CRMT processing unit of the pass-by device may also determine that the pass-by device is in the source destination channel defined by the DST_GRANT message if local registers of the bandwidth resource manager indicate that the channel is already set-up. If it is determined at 484 that the DST_GRANT message has passed the source device, the process proceeds to 486 at which the CRMT processing unit of the pass-by device reads the channel operation field 229 (FIG. 5) of the DST_GRANT message 222 to determine whether the DST_GRANT message is confirming a new channel set-up. If the channel operation field indicates that the DST_GRANT message is confirming a new channel set-up, the process proceeds to step 488 in which the CRMT processing unit 100 turns on the new channel and confirms the initial channel bandwidth, after which the process proceeds to step 490 in which the DST_GRANT message received in step 482 is propagated with the appropriate modifications to the channel operation field 229 (FIG. 5).

If it is determined at 486 that the DST_GRANT message is not requesting a new channel set-up, the process proceeds to step 492 in which the CRMT processing unit 100 (FIG. 2A) reads the channel operation field 229 (FIG. 5) of the DST_GRANT message to determine whether a channel bandwidth increase is being requested. If it is determined at 492 that a channel bandwidth increase is being requested, the process proceeds to step 494 in which the channel bandwidth increase is confirmed by modifying the channel operation field 229 of the DST_GRANT message. If it is determined at 492 that the DST_GRANT message received in step 482 is not requesting a channel bandwidth increase, the process proceeds to step 490 in which the DST_GRANT message is propagated with no changes, after which the process returns.

Figure 10D:
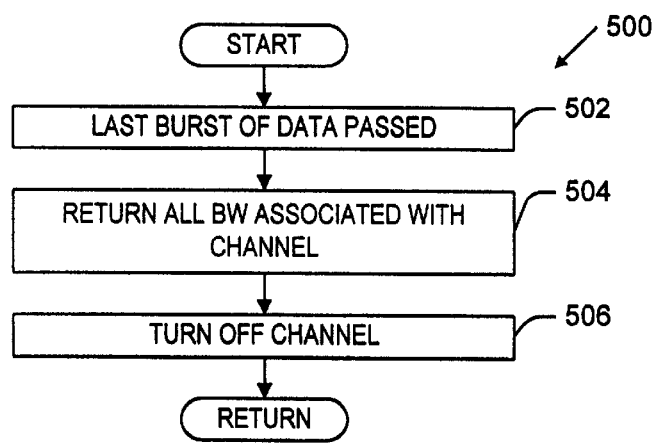

FIG. 10D shows a flow diagram at 500 depicting a pass-by stage behavioral process of a switching device of the packet switching fabric of the present invention in response to the passing of a last burst of packet data through the pass-by device en route between the source device and destination device via the source-destination channel, as required by step 502. From step 502, the process proceeds to step 504 in which the channel bandwidth resource manager 90 (FIG. 2A) of the pass-by device returns all bandwidth resources associated with the corresponding source destination channel. From step 504, the process proceeds to step 506 in which the corresponding channel is turned off by the channel bandwidth resource manager, after which the process returns.

Figure 10E:
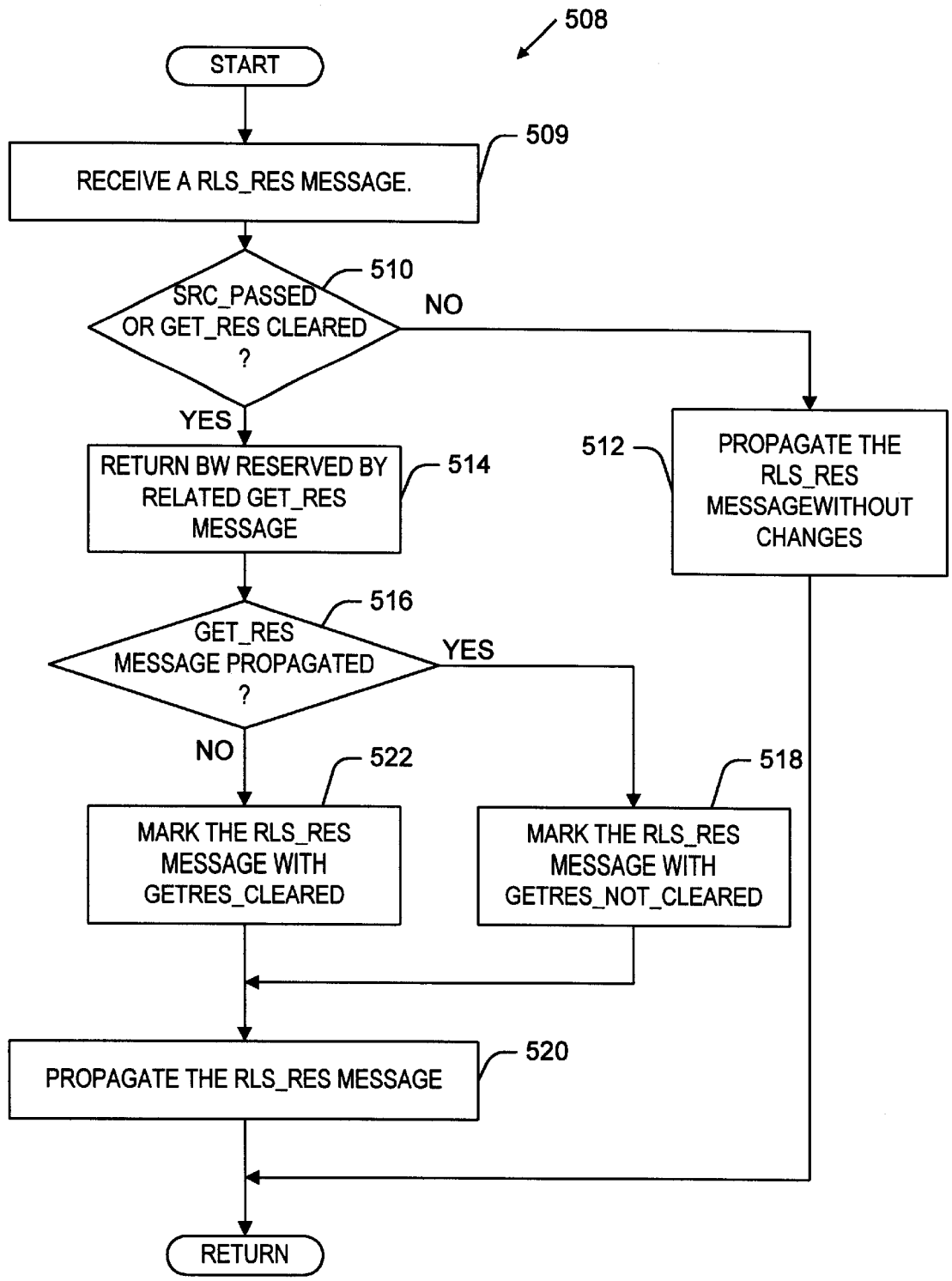

FIG. 10E shows a flow diagram at 508 depicting a pass-by stage behavioral process of a switching device of the switching fabric 10 (FIG. 1) in response to receiving a RLS_RES message, as required by step 509. From step 509, the process proceeds to 510 at which the CRMT processing unit 100 (FIG. 2A) of the pass-by devices reads the SRCD field 243 and the clear field 245 (FIG. 6) of the RLS_RES message to determine whether the RLS_RES message has passed the associated source device or whether the RLS_RES message has been "cleared" to indicate the that the GET RES message associated with the RLS_RES message was not propagated by a previous device in the control ring. If it is determined at 510 that the RLS_RES message has not passed the source device, it is assumed that the current device is not in the source destination channel path and the process proceeds to step 512 in which the RLS_RES message is propagated via the control ring without changes. If it is determined at 510 that the RLS_RES message has been "cleared", it is assumed that the GET_RES message associated with the RLS_RES message was not received at the present device, and the process proceeds to step 512 as described above. However, if it is determined at 510 that the RLS_RES message has passed the source device and that the RLS_RES message has not been cleared, the process proceeds to step 514 in which the channel bandwidth resource manager 90 (FIG. 2A) of the passby device returns the bandwidth reserved by the GET_RES message corresponding to the RLS_RES message received in step 509. From step 514, the process proceeds to step 516 at which it is determined whether the GET_RES message associated with the RLS_RES message received in step 509 has already been propagated.

If it is determined at 516 that the GET_RES message associated with the RLS_RES message received in step 509 has already been propagated, the process proceeds to step 518 in which the CRMT processing unit of the pass-by device marks the clear field 245 (FIG. 6) of the RLS_RES message 234 to indicate that the corresponding GET_RES has not been cleared. From step 518 the process proceeds to step 520 in which the CRMT processing unit of the pass-by device propagates the RLS_RES message downstream via the control ring. If it is determined at 516 that the GET_RES message associated with RLS_RES message received in step 509 has not been propagated, the process proceeds to step 522 in which the CRMT processing unit of the pass-by device modifies the clear field 245 (FIG. 6) of the RLS_RES message to indicate that the corresponding GET_RES message has been cleared, after which the process executes step 520, as described above.

What is claimed is:

1. A packet switching fabric comprising:

means forming a data ring;

means forming a control ring;

means forming a plurality of data communication network links each having at least one network node coupled thereto; and a plurality of switching devices coupled together by said data ring means and said control ring means and for selectively communicatively coupling said network links, each said switching device including, data ring processing means for receiving bursts of data from an adjacent one of said devices via at least one of a plurality of data ring channels concurrently active on said data ring, and for transmitting bursts of data to an adjacent one of said devices via at least one of said plurality of data ring channels, network interface means coupled to said data ring processing means and having at least one network port for transmitting and receiving data packets via one of said network links, said network interface means also having packet buffer means for storing said received data packets, said packet buffer means providing bursts of packet data for transfer to said data ring processing means via a plurality of concurrently active packet buffer channels, and control ring processing means coupled to said data ring processing means and to said network interface means and being responsive to control messages received from an adjacent one of said devices via said control ring, and operative to develop and transmit control messages to an adjacent one of said devices via said control ring, said control messages for reserving bandwidth resources used in setting up and controlling said data ring channels and said packet buffer channels, said control ring processing means also being operative to perform queuing operations for controlling said transfer of said bursts of packet data from said packet buffer to said data ring processing means via said packet buffer channels.

2. A packet switching fabric as recited in claim 1 wherein:

said received data packets stored in said packet buffer means are stored in memory locations specified by corresponding address pointers, each of said received data packets being received via a corresponding source port of said network ports, each of said received data packets including header information specifying a destination address of a destination node;

each said network port having a port ID value associated therewith; and said control ring processing means including, input queuing control means responsive to said destination address specified by said header information of each said received data packet, and operative to identify said port ID value of a destination port of said network ports of a destination one of said devices communicatively coupled to said corresponding destination node, message termination processing means responsive to said destination port ID value, and operative to generate said control messages for reserving said bandwidth resources, and also operative to generate data ring channel request signals associated with locally active ones of said data ring channels sourced from or traversing said switching device in response to said control messages, said message termination processing means being further operative to generate packet buffer channel request signals associated with said packet buffer channels, and queuing enable signals, and bandwidth resource managing means responsive to said data ring channel request signals and said packet buffer channel request signals, and operative to set up and allocate a variable amount of bandwidth for said packet buffer channels and said data ring channels, said input queuing control means also being responsive to said address pointers associated with each said data packet stored in said packet buffer means, and in response to said queuing enable signals, being operative to access said data packets a data burst at a time from said packet buffer means for controlling said transfer of said packet data bursts to said data ring processing means via said packet buffer channels, said input queuing control means also being operative to append each said data burst with block header information including said destination port ID value and an end of packet indicator for indicating whether said data burst is a last data burst of said data packet.

3. A packet switching fabric as recited in claim 2 wherein said control messages include a source request message for requesting setup of a particular one of said data ring channels for transmitting a particular one of said received data packets from said corresponding source port to said corresponding destination port.

4. A packet switching fabric as recited in claim 2 wherein said control messages include sets of associated control messages, each said set of control messages being used to set up and control a particular one of said data ring channels, and also to set up and control a particular one of said packet buffer channels of a source one of said switching devices, said particular data ring channel and said particular packet buffer channel for transmitting a particular one of said data packets stored in said packet buffer of said source device to said corresponding destination port of said corresponding destination device.

5. A packet switching fabric as recited in claim 4 wherein each said control message of each said set includes:

a message field for indicating a message type of said control message;

a source device ID field for carrying a source device ID value identifying said source device of said particular data packet;

a destination device ID field for carrying a destination device ID value identifying said destination device of said particular data packet; and a destination port ID field for carrying a destination port ID value identifying said destination port of said particular data packet.

6. A packet switching fabric as recited in claim 5 wherein said message types of each said set of control messages include:

a source request message developed by said message termination processing means of said source device and transmitted via said control ring towards said corresponding destination device, said source request message for requesting setup of said particular data ring channel for transmitting said particular data packet from said corresponding source port to said corresponding destination port via said data ring and via participating ones of said switching devices disposed between said source device and said destination device;

a get resource message developed by said message termination processing means of said destination device in response to receiving said associated source request message, said get resource message being transmitted from said destination device via said control ring towards said source device, said get resource message for requesting said participating devices to allocate bandwidth resources for setting up said particular data ring channel;

at least one destination grant message developed by said message termination processing means of said destination device in response to a return of said associated get resource message to said destination device via said control ring, said destination grant message being transmitted from said destination device towards said source device via said control ring, said destination grant message for indicating that said bandwidth resources requested by said associated get resource message are allocated, said destination grant message also requesting said source device to transmit a next burst of data from said packet buffer of said source device to said data processing means of said destination device via said particular data ring channel and said particular packet buffer channel of said source device; and a release resource message developed by said message termination processing means of said destination device in response to receiving a last of said data bursts from said source device via said particular data ring channel, said release resource message being transmitted from said destination device towards said source device, said release resource message for requesting each said participating device to release said bandwidth previously allocated for said particular data ring channel in response to said associated get resource message.

7. A packet switching fabric as recited in claim 6 wherein said message termination processing means includes a channel rate timer for controlling the rate at which said destination grant messages are transmitted from said destination device towards said source device via said control ring.

8. A packet switching fabric as recited in claim 7 wherein said source request message further includes a packet priority field for requesting that priority be accorded by said message termination processing means of said associated destination device in arbitrating between a present one of said source resource request messages and competing ones of said source request messages.

9. A packet switching fabric as recited in claim 8 wherein said get resource message further includes:

a channel bandwidth field carrying a channel bandwidth value associated with said particular data ring channel;

a source-passed field for indicating whether said get resource message has been propagated past said corresponding source device; and a bandwidth priority field indicating whether said get resource message is to be given priority in a bandwidth resource arbitration process performed by said bandwidth resource managing means of said participating devices subsequently receiving said get resource message.

10. A packet switching fabric as recited in claim 9 wherein said channel bandwidth value is substantially equal to the bandwidth of said network link connected to said destination port of said particular data packet.

11. A packet switching fabric as recited in claim 9 wherein:

for initial setup of said particular data ring channel, before said get resource message has passed said source device, said channel bandwidth field carries a value indicative of said bandwidth of said destination output port, and after said get resource message has passed said source device, said channel bandwidth field carries a value indicative of said bandwidth approved by said source device; and for incrementally increasing the bandwidth of said particular data ring channel, after initial channel setup, said channel bandwidth field carries a value indicating that said bandwidth of said particular data ring channel is to be increased.

12. A packet switching fabric as recited in claim 11 wherein said release resource message further includes:

a channel bandwidth field indicating a value associated with said bandwidth to be released;

a source-passed field for indicating whether said release resource message has been propagated past said corresponding source device; and a clear field for indicating whether said get resource message associated with said release resource message has not been propagated via said control ring past a previous one of said participating devices of said fabric.

13. A packet switching fabric as recited in claim 12 wherein said destination grant message further includes a channel operation field indicating a type of action to be taken with regard to said corresponding particular data ring channel, said actions including new channel setup, no bandwidth change, and incremental bandwidth change.

14. A packet switching fabric as recited in claim 2 wherein said network interface means further includes:

a receive buffer queue for each of said network ports, each said receive buffer queue having an input connected to receive data packets from a corresponding one of said network ports, and an output connected via a bus to said input queuing control means and also to said packet buffer; and data distribution control means coupled to receive said data bursts received by said data processing means, and having a plurality of outputs each connected to one of said network ports via a corresponding one of a plurality of transmit queue buffers, said data distribution control means including means for reading header information of said data bursts and distributing said data bursts to said corresponding said destination ports.

15. A packet switching fabric as recited in claim 14 wherein said data distribution control means includes a multicast queue for distributing multicast data bursts, having header information specifying multicast addresses, to corresponding multiple ones of said transmit queue buffers for transmission to multiple destination nodes.

16. A packet switching fabric as recited in claim 14 wherein said transmit queue buffers are not large enough to store a whole one of said data packets and wherein cut through packet transfer is implemented through said transmit queue buffers.

17. A packet switching fabric as recited in claim 14 wherein said packet buffer means is implemented by a dynamic RAM memory device.

18. A packet switching fabric as recited in claim 14 wherein at least one of said network links is an Ethernet link having a bandwidth of 10 Mbps.

19. A packet switching fabric as recited in claim 14 wherein at least one of said network links is an Ethernet link having a bandwidth of 100 Mbps.

20. A packet switching fabric as recited in claim 14 wherein at least one of said network links is an Ethernet link having a bandwidth of 1 Gbps.

21. A packet switching fabric as recited in claim 7 wherein said control ring processing means of each said switching device further includes:
   means for generating a local device ID value; and
   a control ring input interface means which provides control message screening functions including,
      reading said message field of a received one of said control messages received via said control ring to determine said message type,
      comparing said local device ID value to said source device ID field to determine if a source match exists,
      comparing said local device ID value to said destination device ID field to determine if a destination match exists, and
      if said message field indicates that said control message is a get resource message or a release resource message,
         reading said source passed field of said received control message, and
         if said source passed field indicates that said message has not passed said source device, and if no source match or destination match exists, transferring said received control message downstream via said control ring.

22. A packet switching fabric as recited in claim 8 wherein, in response to receiving one of said source request messages wherein said destination device ID field of said received source request message matches said local device ID value, said control ring processing means of each said switching device is further operative to perform steps including:
   temporarily storing said received source request message in a source request buffer which is capable of storing additional competing ones of said source request messages;
   performing an arbitration process to select one of said source request messages stored in said source request buffer;
   transmitting a get resource message, corresponding to said selected source request message, downstream via said control ring to request bandwidth resources for requesting set-up of one of said data ring channels defined by said selected source request message; and
   starting a channel acquisition timer which is set to expire after a predetermined maximum time period.

23. A packet switching fabric as recited in claim 7 wherein, in response to a return of said transmitted get resource message to said destination device of origin, said control ring processing means of each said switching device is further operative to perform steps including:
   if said channel acquisition timer has expired, generating and transmitting a release resource message downstream via said control ring to release bandwidth reserved by said returned get resource message; and
   if said channel acquisition timer has not expired, turning on said data ring channel specified by said returned get resource message, transmitting a destination grant message to said source device via said control path to request transmission of a first burst of packet data, and resetting said channel acquisition timer.

24. A packet switching fabric as recited in claim 11 wherein, in response to a return of said transmitted get resource message to said destination device of origin, said control ring processing means of each said switching device is further operative to perform steps including:
   determining whether said channel bandwidth field of said returned get resource message specifies initial set-up of a data ring channel or incremental increase of an existing data ring channel;
   if said channel bandwidth field of said get resource message specifies initial set-up of a data ring channel, determining whether said channel acquisition timer has expired,
      if said channel acquisition timer has expired, generating and transmitting a release resource message downstream via said control ring to release bandwidth reserved by said returned get resource message,
      if said channel acquisition timer has not expired,
         providing a data ring channel request signal to said bandwidth resource managing means requesting local activation of said data ring channel specified by said get resource message,
         transmitting a destination grant message downstream via said control path to confirm bandwidth allocation for said new data ring channel and also to request a first burst of data, and
         resetting said channel acquisition timer; and
   if said channel bandwidth field of said get resource message specifies incremental increase of an existing data ring channel,
      increasing the rate of said channel rate timer,
      determining whether said maximum channel rate has been reached,
      if said maximum channel rate has not been reached, confirming said rate increase by transmitting a destination grant signal, and
      transmitting a get resource message with its channel bandwidth field carrying a value indicating that said bandwidth of said particular data ring channel is to be increased.

25. A packet switching fabric as recited in claim 13 wherein, in response to receiving a burst of data, said control ring processing means of each said switching device is further operative to perform steps including:
   reading said block header of said burst of data to determine whether said received burst of packet data is the last data burst of said data packet;
   if said burst of data is not said last burst of data,
      waiting for said channel rate timer to expire,
      determining whether said channel rate timer has been increased since receiving a previous burst of data,
      if said channel rate has not been increased since receiving a previous burst of data, sending a destination grant message with said channel operation field indicating no bandwidth change, to request a next burst of data, and restarting said channel rate timer,
      if said channel rate has been increased since receiving said previous burst of data, sending a destination grant message with said channel operation field indicating incremental bandwidth to confirm said increased bandwidth, and to request a next burst of data, and restarting said channel rate timer.

26. A packet switching fabric as recited in claim 13 wherein, in response to the return of a destination grant message to said destination device of origin, said control ring processing means is further operative to perform steps including:

reading said channel operation field of said destination grant message;

if said channel operation field indicates an incremental bandwidth change, confirming said rate increase by increasing a corresponding bandwidth counter;

if said destination grant message is confirming a new channel set-up, determining whether said maximum channel rate has been reached; and if said maximum channel rate has not been reached, transmitting a get resource message with said channel bandwidth field indicating a request for an increment in bandwidth.

27. A packet switching fabric as recited in claim 22 wherein, in response to receiving a get resource message, said control ring processing means of each said switching device is further operative to perform steps including:

if said source match exists,
temporarily storing said get resource message in a control message buffer,
reading said channel bandwidth field of said get resource message to determine said channel bandwidth value;
providing a packet buffer channel request signal to said bandwidth resource managing means requesting packet buffer channel bandwidth specified by said channel bandwidth value, and waiting for said bandwidth resource managing means to allocate said requested packet biiffer channel bandwidth;
providing a data ring channel request signal to said bandwidth resource managing means requesting data ring channel bandwidth specified by said channel bandwidth value, and waiting for said bandwidth resource managing means to allocate said requested data ring channel bandwidth;
determining whether a release resource message has been received
if a release resource message has not been received, transmitting a get resource to said destination device via said control ring.

28. A method of manufacturing a packet switching fabric comprising the steps of:

forming a data ring;

forming a control ring; and providing a plurality of switching devices coupled together by said data ring means and said control ring means so that a plurality of data communication network links, each having at least one network node coupled thereto, can be selectively communicatively coupled, each said switching device being fabricated by performing steps including, providing data ring processing means for receiving bursts of data from an adjacent one of said devices via at least one of a plurality of data ring channels concurrently active on said data ring, and for transmitting bursts of data to an adjacent one of said devices via at least one of said plurality of data ring channels, providing network interface means coupled to said data ring processing means and having at least one network port for transmitting and receiving data packets via one of said network links, said network interface means also having packet buffer means for storing said received data packets, said packet buffer means providing bursts of packet data for transfer to said data ring processing means via a plurality of concurrently active packet buffer channels, and providing control ring processing means coupled to said data ring processing means and to said network interface means and being responsive to control messages received from an adjacent one of said devices via said control ring, and operative to develop and transmit said control messages to an adjacent one of said devices via said control ring, said control messages for reserving bandwidth resources used in setting up and controlling said data ring channels and said packet buffer channels, said control ring processing means also being operative to perform queuing operations for controlling said transfer of said bursts of packet data from said packet buffer to said data ring processing means via said packet buffer channels.

* * * * *